United States Patent

Yamazaki et al.

[11] Patent Number: 5,909,662
[45] Date of Patent: Jun. 1, 1999

[54] SPEECH PROCESSING CODER, DECODER AND COMMAND RECOGNIZER

[75] Inventors: Yasushi Yamazaki; Tomohiko Taniguchi; Tomonori Sato; Hitoshi Matsuzawa; Chiharu Kawai, all of Kawasaki, Japan

[73] Assignee: Fujitsu Limited, Kanagawa, Japan

[21] Appl. No.: 08/793,838
[22] PCT Filed: Aug. 8, 1996
[86] PCT No.: PCT/JP96/02254
§ 371 Date: Mar. 11, 1997
§ 102(e) Date: Mar. 11, 1997
[87] PCT Pub. No.: WO97/07498
PCT Pub. Date: Feb. 27, 1997

[30] Foreign Application Priority Data

Aug. 11, 1995 [JP] Japan .................................. 7-205884

[51] Int. Cl.$^6$ .................................................. G10L 3/02
[52] U.S. Cl. .................................................. 704/221
[58] Field of Search .................................. 704/222, 200, 704/221, 230, 231, 254, 255, 266

[56] References Cited

U.S. PATENT DOCUMENTS

| | | | |
|---|---|---|---|
| 4,799,261 | 1/1989 | Lin et al. | 704/219 |
| 5,305,421 | 4/1994 | Li | 704/219 |
| 5,333,236 | 7/1994 | Bahl et al. | 704/256 |
| 5,627,939 | 5/1997 | Huang et al. | 704/222 |
| 5,633,984 | 5/1997 | Aso et al. | 704/260 |
| 5,680,506 | 10/1997 | Kroon et al. | 704/203 |

FOREIGN PATENT DOCUMENTS

| | | |
|---|---|---|
| 0423800 | 10/1990 | European Pat. Off. . |
| 0527535 | 8/1992 | European Pat. Off. . |
| 4126882 | 2/1993 | Germany . |
| 6183598 | 4/1986 | Japan . |
| 3132797 | 6/1991 | Japan . |
| 5241590 | 9/1993 | Japan . |

Primary Examiner—David R. Hudspeth
Assistant Examiner—Donald L. Storm
Attorney, Agent, or Firm—Helfgott & Karas, P.C.

[57] ABSTRACT

The present invention relates to a speech processing device equipped with both a speech coding/decoding function and a speech recognition function, and is aimed at providing a speech processing device equipped with both a speech coding/decoding function and a speech recognition function by using a small amount of memory. The speech processing device of the present invention includes a speech analysis unit for obtaining analysis results by analyzing input speech, a codebook for storing quantization parameters and quantization codes indicating the quantization parameters, a quantizing unit for selecting the quantization parameters and the quantization codes corresponding to the analysis results from the codebook and for outputting selected quantization parameters and selected quantization codes, a coding unit for outputting encoded codes of the input speech including the selected quantization codes, a speech dictionary for storing registered data which represent speech patterns by using the codebook, and a matching unit for obtaining the speech patterns corresponding to the input speech by using one of the analysis results, the selected quantization parameters, and the selected quantization codes.

29 Claims, 23 Drawing Sheets

F I G. 2
PRIOR ART

|  | TYPE 1 | TYPE 2 |
|---|---|---|
| CODEBOOK | SPEECH WAVEFORM | SOUND-SOURCE SIGNAL<br>LPC COEFFICIENT |
| ANALYZING UNIT | WINDOW OPERATION | WINDOW OPERATION<br>LPC ANALYSIS |
| QUANTIZING UNIT | SEARCHING IN CODEBOOK FOR SPEECH WAVEFORM CLOSEST TO INPUT | SEARCHING IN CODEBOOK FOR THE CLOSEST LPC COEFFICIENTS AND RESIDUAL SIGNALS |
| INVERSE-QUANTIZING UNIT | EXTRACTING SPEECH WAVEFORM FROM CODEBOOK | EXTRACTING LPC COEFFICIENTS AND SOUND-SOURCE SIGNALS FROM CODEBOOK |
| SYNTHESIZING UNIT | CONNECTING AND INTERPOLATING WAVEFORMS | SYNTHESIZING SPEECH BY USING SOUND-SOURCE SIGNALS AND LPC COEFFICIENTS |

FIG. 4

| | $\alpha_1$ | | | | $\alpha_n$ |
|---|---|---|---|---|---|
| 0 1 | 0.089 | | | 0 1 | 0.204 |
| 0 2 | 0.398 | ... | | 0 2 | 0.452 |
| 0 3 | −0.901 | | | 0 3 | −0.390 |
| . | | | | . | |
| . | | | | . | |

FIG. 5A

| 0 1 | 0.54, 0.78, 0.98, 0.65, −0.12, −0.23, 0.24, 0.01, −0.23, · · |
|---|---|
| 0 2 | −0.12, 0.12, 0.32, 0.21, 0.03, −0.12, −0.23, 0.87, 0.19, · · |
| . | |
| . | |

FIG. 5B

| 0 1 | 0.28, −0.43, 0.18, 0.32, −0.12, −0.52, −0.78, −0.33, 0.13, · · |
|---|---|
| 0 2 | −0.43, 0.18, 0.32, −0.12, −0.52, −0.78, −0.33, 0.13, 0.19, · · |
| . | |
| . | |

FIG. 6A

| | g |
|---|---|
| 01 | 0.293 |
| 02 | 3.409 |
| 03 | 8.190 |
| . | . |
| . | . |

FIG. 6B

| | b |
|---|---|
| 01 | 0.321 |
| 02 | 2.195 |
| 03 | 11.031 |
| . | . |
| . | . |

FIG. 7

| | α | | | | | i | b | j | g |
|---|---|---|---|---|---|---|---|---|---|
| 01 | 3 | 1 | 2 | 1 | 4 | 15 | 4 | 30 | 7 |
| 02 | 3 | 1 | 3 | 2 | 2 | 13 | 3 | 47 | 3 |
| . | . | . | . | . | . | . | . | . | . |
| n | 1 | 1 | 3 | 4 | 1 | 7 | 12 | 2 | 8 |

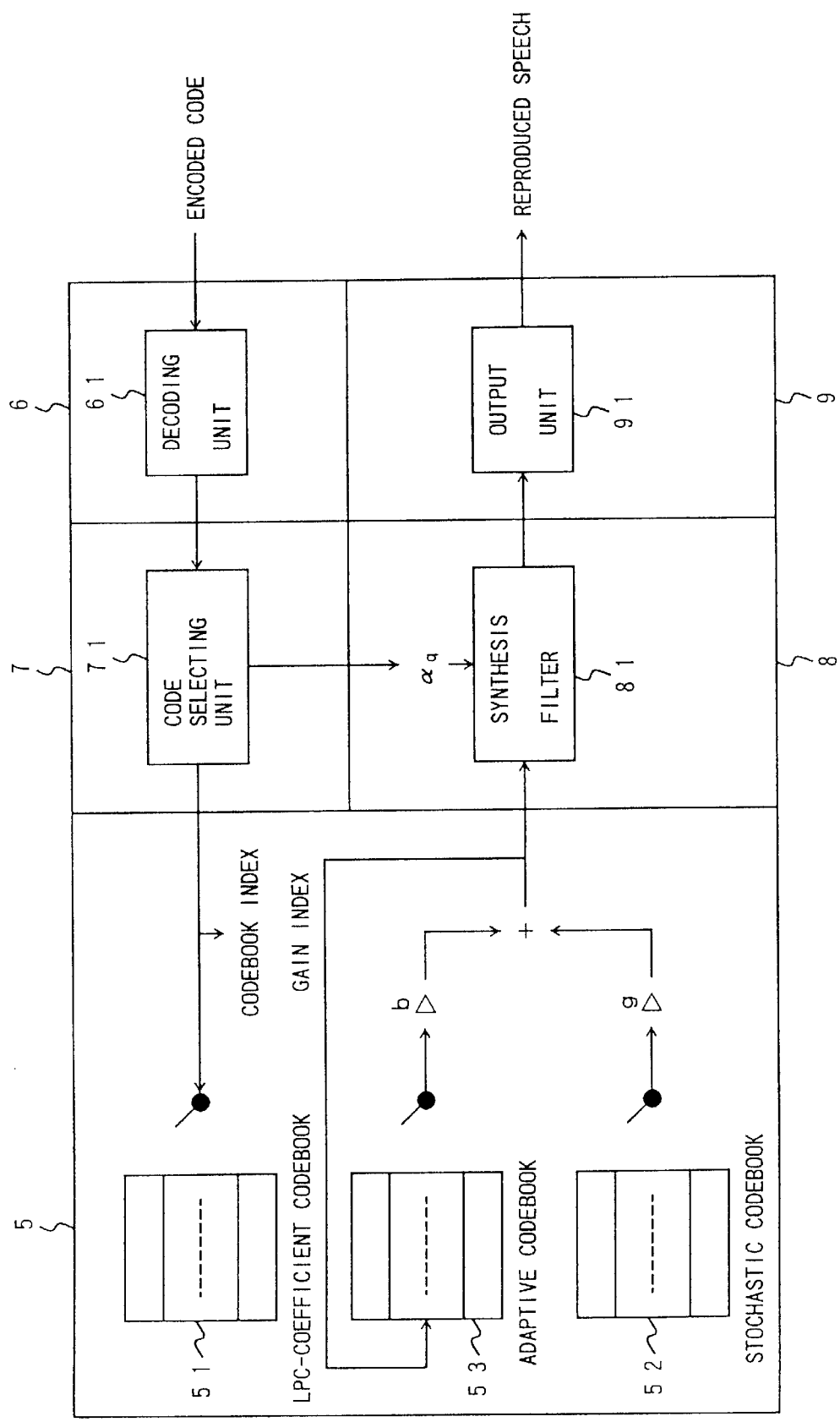

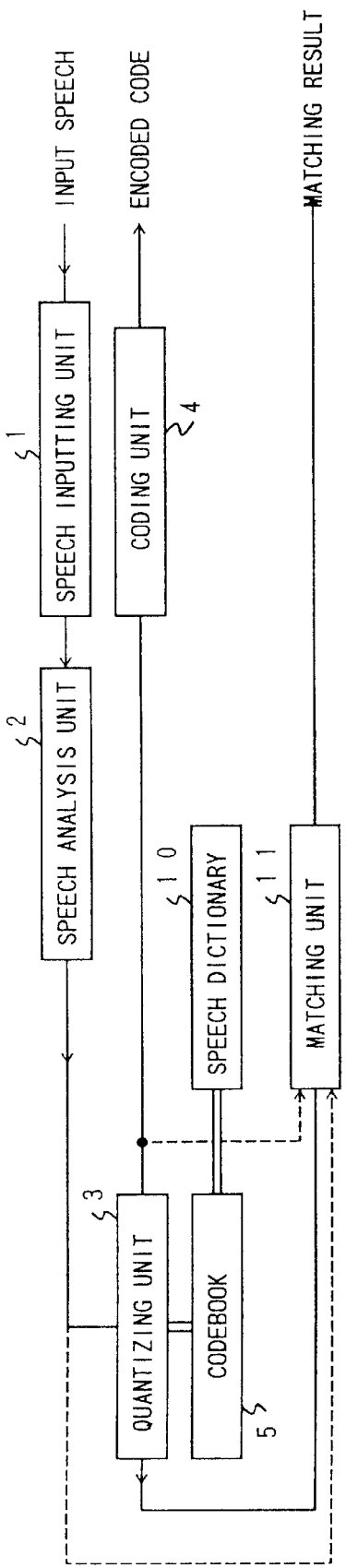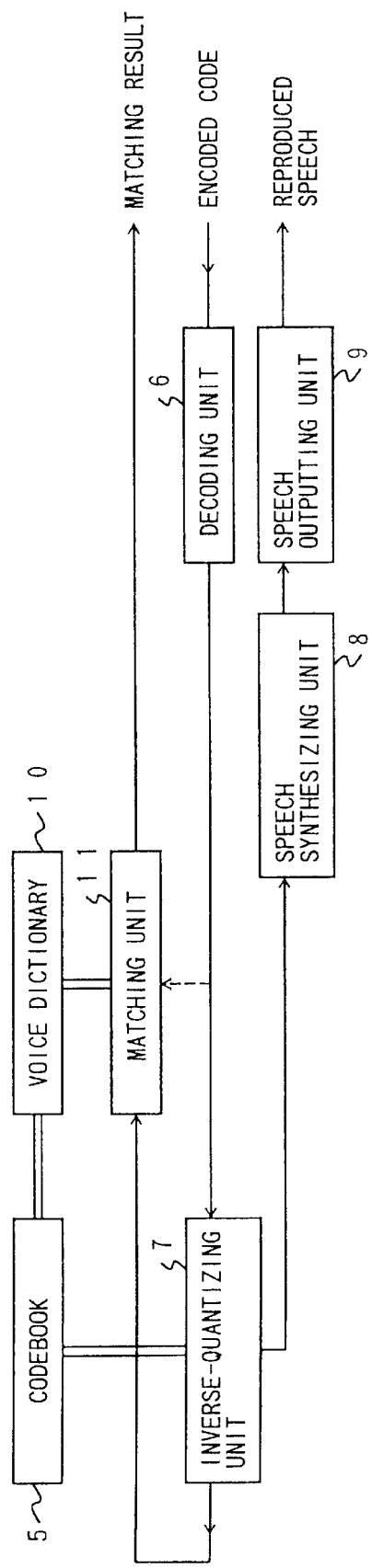

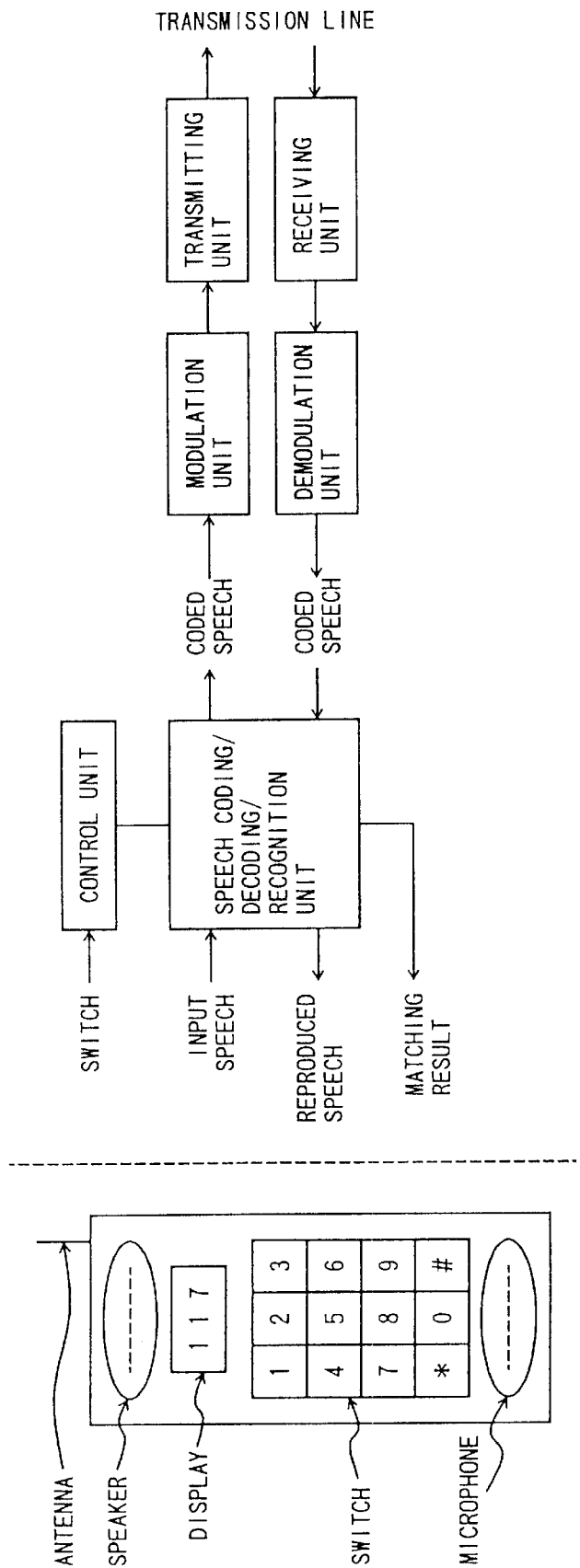

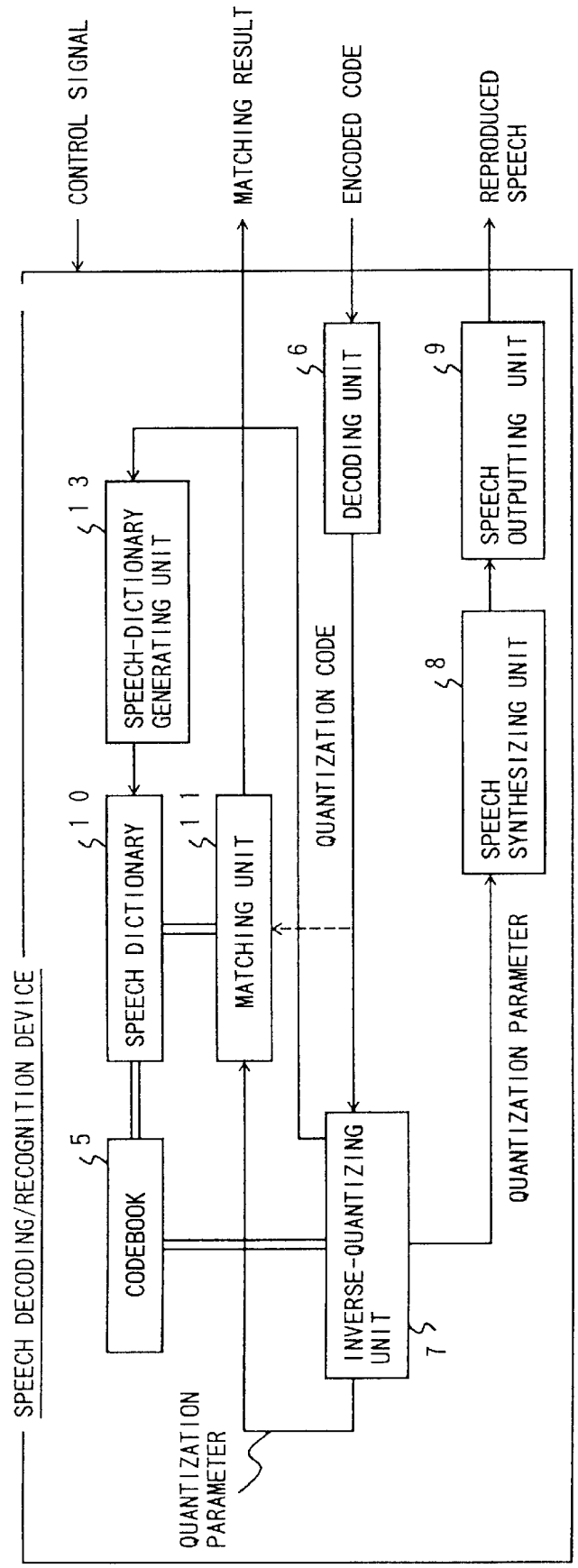
F I G. 1 5

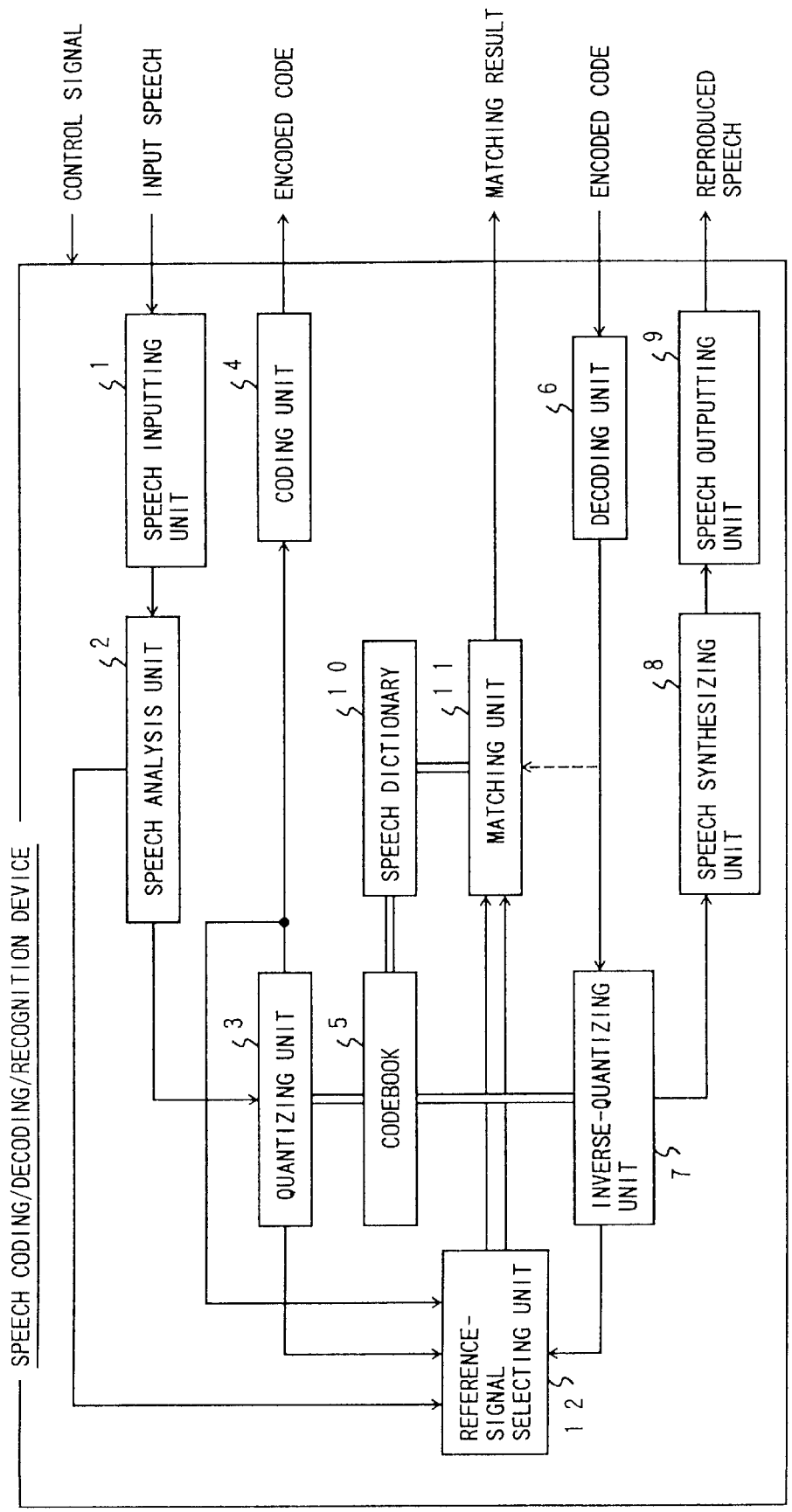

F I G. 2 2

|  | RECOGNITION PERFORMANCE | USED MEMORY VOLUME |
|---|---|---|
| SEPARATE CODING/DECODING DEVICE AND RECOGNITION DEVICE | ○ | × |
| SHARED USE OF CODEBOOK | △ | ○ |
| SHARED USE OF CODEBOOK AND DICTIONARY CONVERSION AT TIME OF RECOGNITION | ○ | ○ |

FIG. 24

|   | α | | | | | i | b | j | g |
|---|---|---|---|---|---|---|---|---|---|
| 0 1 | 3 | 1 | 2 | 1 | 4 | 1 | 7 | 1 | 7 |
| 0 2 | 3 | 1 | 3 | 2 | 2 | 1 | 7 | 2 | 3 |
| . | . | . | . | . | . | . | . | . | . |
| n | 1 | 1 | 3 | 4 | 1 | 1 | 7 | 2 0 | 8 |

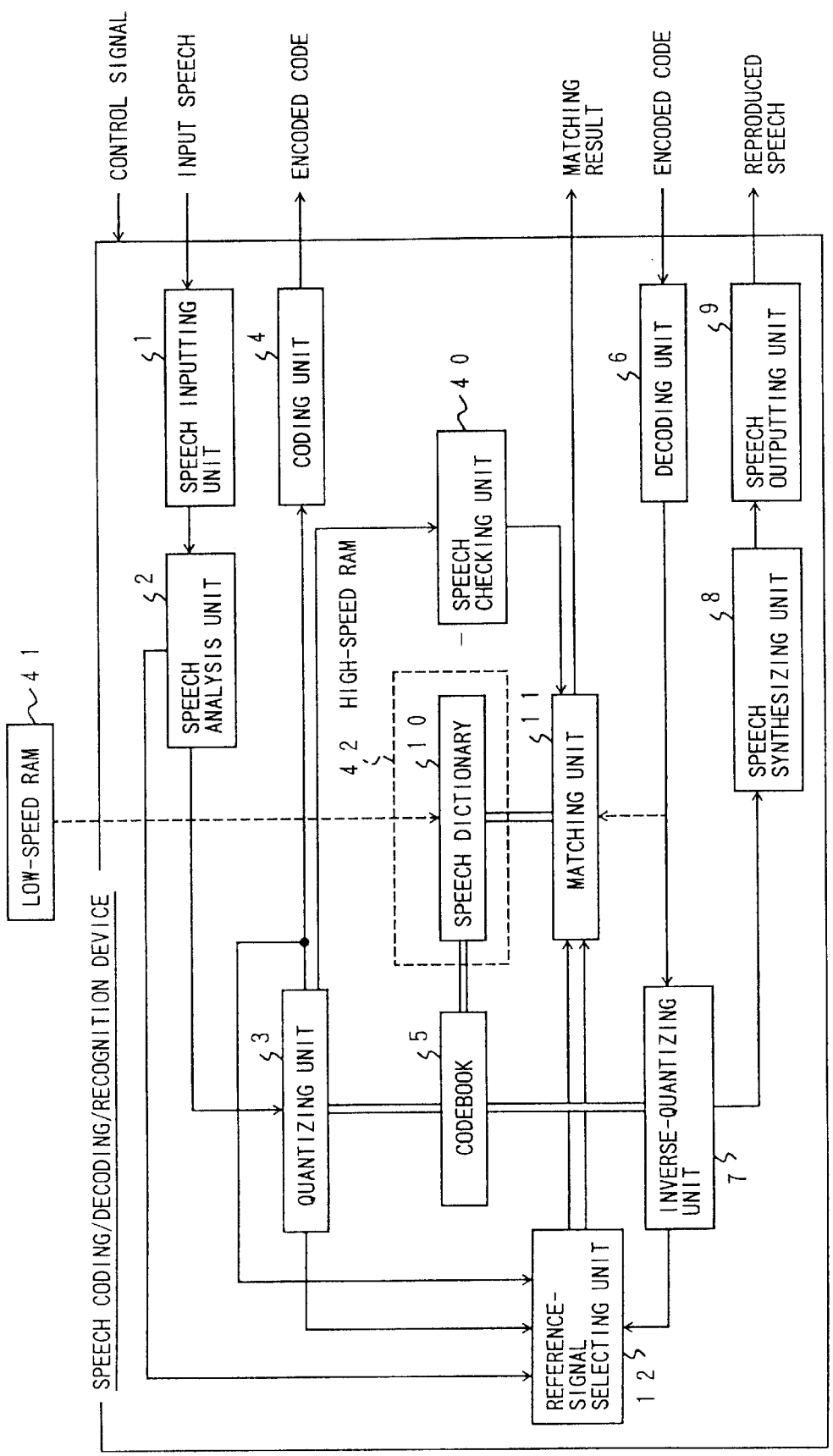

SPEECH PROCESSING CODER, DECODER AND COMMAND RECOGNIZER

FIELD OF THE INVENTION

The present invention generally relates to a speech processing device which is equipped with both a speech coding/decoding function and a speech recognition function The speech processing device of the present invention can be used as a speech coding/decoding device (CODEC: COder-DECoder) in a digital mobile phone, for example, and can incorporate a speech recognition function into equipment having such a speech coding/decoding device.

BACKGROUND OF THE INVENTION

FIG. 1 is a block diagram of a speech coding/decoding device of the prior art which encodes and decodes speech information by using a codebook.

In a speech coding device, speech input via a speech inputting unit 1 is analyzed by a speech analysis unit 2. Results of the analysis by the speech analysis unit 2 are then quantized based on a codebook 5 by a quantizing unit 3 to generate quantization parameters The quantizing unit 3 further generates more than one type of quantization codes (e.g., indexes of the codebook) which indicate the quantized values (quantized parameters), and supplies these quantization codes of more than one type to a coding unit 4. The coding unit 4 multiplexes the quantization codes to generate encoded codes. Here, the codebook 5 is stored in a ROM.

In a speech decoding device, received encoded codes are separated by a decoding unit 6 into more than one type of quantization codes The separated quantization codes are then subjected to an inverse quantizing process based on the codebook 5 by an inverse-quantizing unit 7 to generate quantization parameters. A speech synthesizing unit 8 synthesizes the speech by using the quantization parameters, so that a speech outputting unit 9 outputs the speech.

Parameters in the codebook 5 used for the quantization process may vary in types, and different processes may be carried out, depending on the types of the parameters, by the speech analysis unit 2, the quantizing unit 3, the inverse-quantizing unit 7, and the speech synthesizing unit 8. For different types of parameters, the speech coding/decoding device may have different configurations as shown in FIG. 2.

FIG. 2 is a table chart showing two different configurations of the vice coding/decoding device of the prior art.

In FIG. 2, the type-1 speech coding/decoding device uses speech waveforms as parameters of the codebook 5. In the speech coding unit, an input speech signal is divided (windowed) into speech signals of a predetermined time length. The quantizing unit then searches in the codebook for speech waveforms closest to the windowed speech signals, and obtains quantization codes of these speech waveforms. In the speech decoding unit, speech waveforms are successively extracted from the codebook by using received quantization codes. The speech waveforms are then interpolated and connected by the speech synthesizing unit to output a speech signal.

The type-2 speech coding/decoding device of type 2 is a device based on a CELP (code excited linear prediction) method, for example, and uses speech-source signals and LPC coefficients as parameters of the codebook. In the type-2 speech coding device, a speech signal is divided (windowed) into speech signals of a predetermined time length, and an LPC analysis is applied. The quantizing unit searches in the codebook for quantized LPC coefficients (quantization parameters) closest to the results of the analysis and for quantization codes indicating the quantization parameters, and, also, searches in the codebook for the most appropriate speech source. In the speech decoding unit, LPC coefficients and speech-source signals are extracted from the codebook by using received quantization codes. The synthesizing unit then synthesizes speech by using the LPC coefficients and the speech-source signals.

In the following, an example of a configuration when the CELP method is used in a speech coding/decoding device will be described.

FIG. 3 is a block diagram of an example of a speech coding device which employs the CELP method. In FIG. 3, the same reference numerals as those of FIG. 1 represent corresponding circuit blocks of FIG. 1.

The speech coding device of the CELP method emulates vocal-cord vibrations and vocal-tract-transmission characteristics of a human voicing mechanism. Namely, vocal-cord vibrations are emulated by a speech-source codebook, and the vocal-tract-transmission characteristics are emulated by a linear filter which uses LPC coefficients as filter coefficients. Differences between a synthesized speech signal and an input speech signal are minimized by adjusting indexes and gains which are used with respect to the speech-source codebook. Speech-source-code indexes and gain indexes of the gains which minimize the differences are output together with the indexes of the LPC coefficients.

In the speech coding device of FIG. 3, the speech analysis unit 2 includes an LPC analyzing unit 21 for analyzing LPC coefficients of input speech. The codebook 5 includes an LPC-coefficient codebook 51 containing LPC coefficients and representative vectors, and includes a stochastic codebook 52 and adaptive codebook 53 serving as a speech source. The quantizing unit 3 includes a code selecting unit 31, a synthesis filter 32, and an error minimizing unit 33.

The LPC analyzing unit 21 applies a window operation to an input speech signal so as to divide the input signal into a plurality of frames (frame 1, frame 2, frame 3, . . . ) having a predetermined time length. The LPC analyzing unit 21 further conducts the LPC analysis on each frame to obtain a plurality of LPC coefficients $\alpha_1$ through $\alpha_n$ with respect to each frame.

The code selecting unit 31 selects quantization codes (codebook indexes) of the LPC coefficients $\alpha_1$ through $\alpha_n$ from the LPC-coefficient codebook 51 based on the LPC coefficients $\alpha_1$ through $\alpha_n$ obtained through the analysis of the input speech. Upon the selection of the quantization codes, the code selecting unit 31 outputs the quantization codes and quantized LPC coefficients $\alpha_{q1}$ through $\alpha_{qn}$ corresponding to the quantization codes (subscripts "q" represents quantization). The quantized LPC coefficients $\alpha_{q1}$ through $\alpha_{qn}$ differ from the LPC coefficients $\alpha_1$ through $\alpha_n$ only in that less significant digits thereof are rounded.

The synthesis filter 32 uses the quantized LPC coefficients $\alpha_{q1}$ through $\alpha_{qn}$ from the code selecting unit 31 as the filter coefficients. Based on these filter coefficients, the speech is synthesized by using excitation signals, which are generated based on representative vectors in the stochastic codebook 52 and the adaptive codebook 53. These excitation signals represent the vocal-cord vibrations, and the filter coefficients emulate the vocal-tract-transmission characteristics The vocal-tract-transmission characteristics are reflection characteristics of a portion extending from the throat to the lips and the nose. Here, the adaptive codebook 53 keeps updating previous signals.

The error minimizing unit 33 compares the input speech with the speech synthesized by the synthesis filter 32, and controls the codebook indexes and the gain indexes with respect to the stochastic codebook 52 and the adaptive codebook 53 so as to minimize differences between the input speech and the synthesized speech. Namely, the error minimizing unit 33 adjusts quality and magnitude of the vocal-cord vibrations such that the synthesized speech becomes equal to the input speech.

In the speech coding device, the code selecting unit 31 searches in the LPC-coefficient codebook 51 for the quantized LPC coefficients when the LPC coefficients are obtained through the analysis by the LPC analyzing unit 21.

FIG. 4 is an illustrative drawing showing an example of the LPC-coefficient codebook of FIG. 3. As shown in FIG. 4, representative coefficient values (quantized LPC coefficients) are provided for each of the LPC coefficients $\alpha_1$ through $\alpha_n$, and each of the representative coefficient values has an assigned index 01, 02, . . . , or so on. If the LPC coefficient $\alpha_1$ obtained by the LPC analyzing unit 21 is 0.3984523, for example, the code selecting unit 31 searches in the LPC-coefficient codebook 51 to select a quantization code 02 and a quantized LPC coefficient of 0.398. The same operation is carried out for each of the LPC coefficients $\alpha_1$ through $\alpha_n$.

Based on the quantized LPC coefficients, the synthesis filter 32 synthesizes a speech signal, and the error minimizing unit 33 determines the indexes and gains b and g with respect to the adaptive codebook 53 and the stochastic codebook 52 such that differences between the synthesized speech and the input speech become a minimum The adaptive codebook 53 is used for emulating cycles (pitch, speech height) of vowels with regard to the vocal-cord vibrations, and the stochastic codebook 52 is used for emulating random vocal-cord vibrations representing consonants.

FIGS. 5A and 5B are table charts showing examples of the stochastic codebook 52 and the adaptive codebook 53 of FIG. 3. In the stochastic codebook 52 of FIG. 5A, for example, a series of figures (0.54, 0.78, 0.98, 0.65, . . . ) represents a temporal fluctuation of a signal. Namely, with an index being provided, a signal fluctuating over time is generated, as expressed by a series of figures corresponding to the provided index. The same applies in the adaptive codebook 53 of FIG. 5B. In this manner, signals having temporal fluctuations are extracted from the stochastic codebook 52 and the adaptive codebook 53, corresponding to codebook indexes provided from the error minimizing unit 33. These signals are subjected to changes in gain according to the gains g and b, and, then, are added together to be supplied to the synthesis filter 32. FIG. 6A is a table chart showing an example of the gain index g in the stochastic codebook 52 of FIG. 3, and FIG. 6B is a table chart showing an example of the gain index b in the adaptive codebook 53 of FIG. 3. As shown in FIGS. 6A and 6B, each gain has an assigned gain index 01, 02, . . . or so on.

A coding unit 41 receives the indexes (quantization codes) of the LPC-coefficient codebook 51, the codebook indexes and gain indexes with respect to the stochastic codebook 52, and the codebook indexes and gain indexes with respect to the adaptive codebook 53, all of which are obtained by the above-described process. The coding unit 41 multiplexes these indexes to generate encoded codes, which are modulated by a modulator (not shown) and transferred to the receiver side.

FIG. 7 is an illustrative drawing showing an example of the transferred encoded codes. A plurality of LPC coefficients and each one of the other types of indexes are put together to be transferred as a frame. FIG. 7 shows an example in which each frame contains five LPC coefficients. In FIG. 7, indexes of the adaptive codebook 53 are denoted by "i", and gain indexes for the adaptive codebook 53 are denoted by "b". Further, indexes of the stochastic codebook 52 are indicated by "j", and gain indexes with regard to the stochastic codebook 52 are represented by "g".

FIG. 8 is a block diagram of an example of a speech decoding device which employs the CELP method.

In the speech decoding device of FIG. 8, a decoding unit 61 is a circuit for separating a plurality of quantization codes multiplexed on the transmission side. The inverse-quantizing unit 7 includes a code selecting unit 71 for selecting representative vectors from the codebook 5 based on the separated quantization codes. The codebook 5 has the same structure as that on the transmission side, and the speech synthesizing unit 8 includes a synthesis filter 81 which is the same filter as that of the transmission side.

The speech decoding device carries out an inverse process of the process of the speech coding device. Namely, LPC coefficients, temporally fluctuating signals forming a basis of vocal-cord vibrations, and gains for the temporally fluctuating signals are searched for in the codebook 5 by using the quantization codes extracted by the decoding unit 61, and are used by the synthesis filter 81 to reproduce speech. The adaptive codebook 53 updates previous signals in the same manner as in the speech coding device.

In a digital mobile phones or the like, provision of a speech recognition function would enable speech dialing, for example, which allows a name of a person to be given as a speech input and to be recognized by the speech recognition function, and searching for a corresponding phone number to automatically phone this person. Thus, a convenient function is provided to replace conventional registered dialing.

In equipping a digital mobile phone or the like with a speech recognition function, a speech coding/decoding device used in the digital mobile phone may be utilized for implementing the speech recognition function. In doing so, a speech inputting unit as well as a speech analysis unit, if necessary, can be shared by both the speech recognition function and the speech coding/decoding device. However, a speech dictionary becomes necessary for the speech recognition in order to match speech inputs of names with phone numbers, thereby resulting in a memory-volume increase commensurate with the number of words and the length of items. Simply combining the speech recognition function with the speech coding/decoding function may create a situation in which the auxiliary speech recognition function ends up using a larger memory volume than the speech coding/decoding function. In consideration of this, it is desirable in practice to provide a speech recognition function for a speech coding/encoding device without significantly increasing a memory volume.

Accordingly, as a first point, there is a need to provide a speech processing device having both the speech coding/encoding functions and the speech recognition function without using a large memory volume.

When the speech recognition function is provided for the phones or the like, this function may be used for recognizing speech signals transmitted from the other end of the line for various purposes. In digital mobile phones or the like employing the CELP method, speech is quantized, coded, and transmitted to a receiver side, and, on the receiver side, the speech is synthesized and reproduced based on the received information. In such a case, the reproduced speech synthesized from the received information (quantization codes) needs to be used for speech recognition in the same manner as when original speech of an operator is used in the case of speech dialing. Since there are many intervening processing steps prior to the speech recognition, however, a recognition rate may deteriorate.

Accordingly, as a second point, there is a need to increase a speech-recognition rate of a speech processing device which has both the speech coding/decoding function and the speech recognition function implemented through use of a small volume memory.

In the automatic dialing for automatically making a phone call in response to a speech input, when a name of a person to call is recognized, there is a need to reconfirm whether a recognition result is correct before actually making a call. If the speech-recognition result is only indicated on a liquid-cristal display, however, an operator needs to move his/her eyes for confirmation of the displayed result In order to enhance the convenience of the digital mobile phones or the like equipped with the automatic dialing function, it would be better to have results of the speech recognition indicated by speech. If a speech synthesizing unit for this purpose is simply added to a device having the speech coding/decoding function and the speech recognition function, such an addition may lead to a cost increase.

Accordingly, as a third point, there is a need to incorporate a speech synthesizing function with respect to recognition results into a speech processing device which has both the speech coding/decoding function and the speech recognition function implemented through use of a small memory volume.

The present invention is directed to the problems described above, and is aimed at providing a speech processing device using a small memory volume while equipping this speech processing device with both the speech coding/decoding function and the speech recognition function.

Also, it is another object of the present invention to enhance a speech-recognition rate of the speech processing device which is equipped with both the speech coding/decoding function and the speech recognition function using a small memory volume.

Further, it is still another object of the present invention to efficiently incorporate a speech synthesizing function for recognition results into a speech processing device which has both the speech coding/decoding function and the speech recognition function using a small memory volume.

SUMMARY OF THE INVENTION

According to the present invention, a speech processing device includes:

a codebook for storing quantization parameters and quantization codes indicating said quantization parameters;

a quantizing unit for selecting said quantization parameters and said quantization codes corresponding to said analysis results from said codebook and for outputting selected quantization parameters and selected quantization codes;

a coding unit for outputting encoded codes of said input speech, said encoded codes including said selected quantization codes;

a speech dictionary for storing registered data which represent speech patterns by using said codebook; and a matching unit for obtaining said speech patterns corresponding to said input speech by using one of said analysis results, said selected quantization parameters, and said selected quantization codes.

In the speech processing device described above, the codebook used by a speech coding/encoding device is utilized as a speech dictionary so as to avoid a memory increase created when a speech recognition function is incorporated into a speech coding/decoding function. The speech coding/encoding device uses the codebook containing the quantization codes and the quantization parameters to encode the input speech into the quantization codes. The speech dictionary used for the speech recognition contains series of the quantization codes as registered words, and these series of the quantization codes indicate the quantization parameters in the codebook to represent speech patterns. In this manner, use of memory volume can be reduced compared to a conventional speech dictionary.

Further, the present invention transforms the quantization parameters into parameters suitable for the speech recognition during a speech recognition process, with an aim of enhancing a speech-recognition rate of the speech processing device which is equipped with both the speech coding/decoding function and the speech recognition function using a small memory volume. In one embodiment, the quantization parameters are LPC coefficients, and the parameters suitable for recognition are LPC cepstrum coefficients.

Further, the present invention, with an aim of efficiently incorporating a speech synthesizing function with regard to recognition results into a speech processing device which has both the speech coding/decoding function and the speech recognition function using a small memory volume, includes a means for extracting series of the quantization parameters from the codebook as recognition results, and for internally generating parameters for speech-source emulation which are parameters necessary for speech synthesizing in addition to the already provided parameters. The function of this means saves an additional memory volume which would be necessary for storing the parameters for the speech-source emulation. Also, a speech synthesizing function for registered words is efficiently implemented by using a speech synthesizing unit of the speech decoding device for synthesizing speech.

BRIEF DESCRIPTION OF THE DRAWINGS

FIG. 2 is a table chart showing two different configurations of the vice coding/decoding device of the prior art.

FIG. 4 is an illustrative drawing showing an example of the LPC-coefficient codebook of FIG. 3.

FIGS. 5A and 5B are table charts showing examples of the stochastic codebook and the adaptive codebook of FIG. 3.

FIG. 6A is a table chart showing an example of the gain index in the stochastic codebook of FIG. 3.

FIG. 6B is a table chart showing an example of the gain index in the adaptive codebook of FIG. 3.

FIG. 7 is an illustrative drawing showing an example of the transferred encoded codes.

FIG. 8 is a block diagram of an example of a speech decoding device which employs the CELP method.

FIG. 9A is a block diagram of an example of a speech coding device according to the present invention.

FIG. 9B is a block diagram of an example of a speech decoding device according to the present invention.

FIGS. 10A and 10B are illustrative drawings for explaining a schematic configuration of a digital mobile phone to which the speech processing device of the present invention is applied.

FIG. 15 is a block diagram of another embodiment of a speech decoding/recognition device according to the present invention.

FIG. 16 is a block diagram of an embodiment of a speech coding/decoding/recognition device according to the present invention.

FIG. 22 is a chart showing comparisons between a prior-art configuration, a configuration in which LPC coefficients of the codebook are shared, and a configuration in which the LPC coefficients of the codebook are shared and a parameter conversion is conducted at the time of recognition.

FIG. 24 is a table chart showing an example of indexes corresponding to parameters which are generated or extracted from the speech dictionary 10 by the parameter generating unit 30 of FIG. 23.

FIG. 25 is a block diagram of a speech processing device serving as a speech coding/decoding/recognition device equipped with a low-speed RAM and a speech checking unit.

BEST CONFIGURATIONS FOR IMPLEMENTING THE INVENTION

Figure 1:
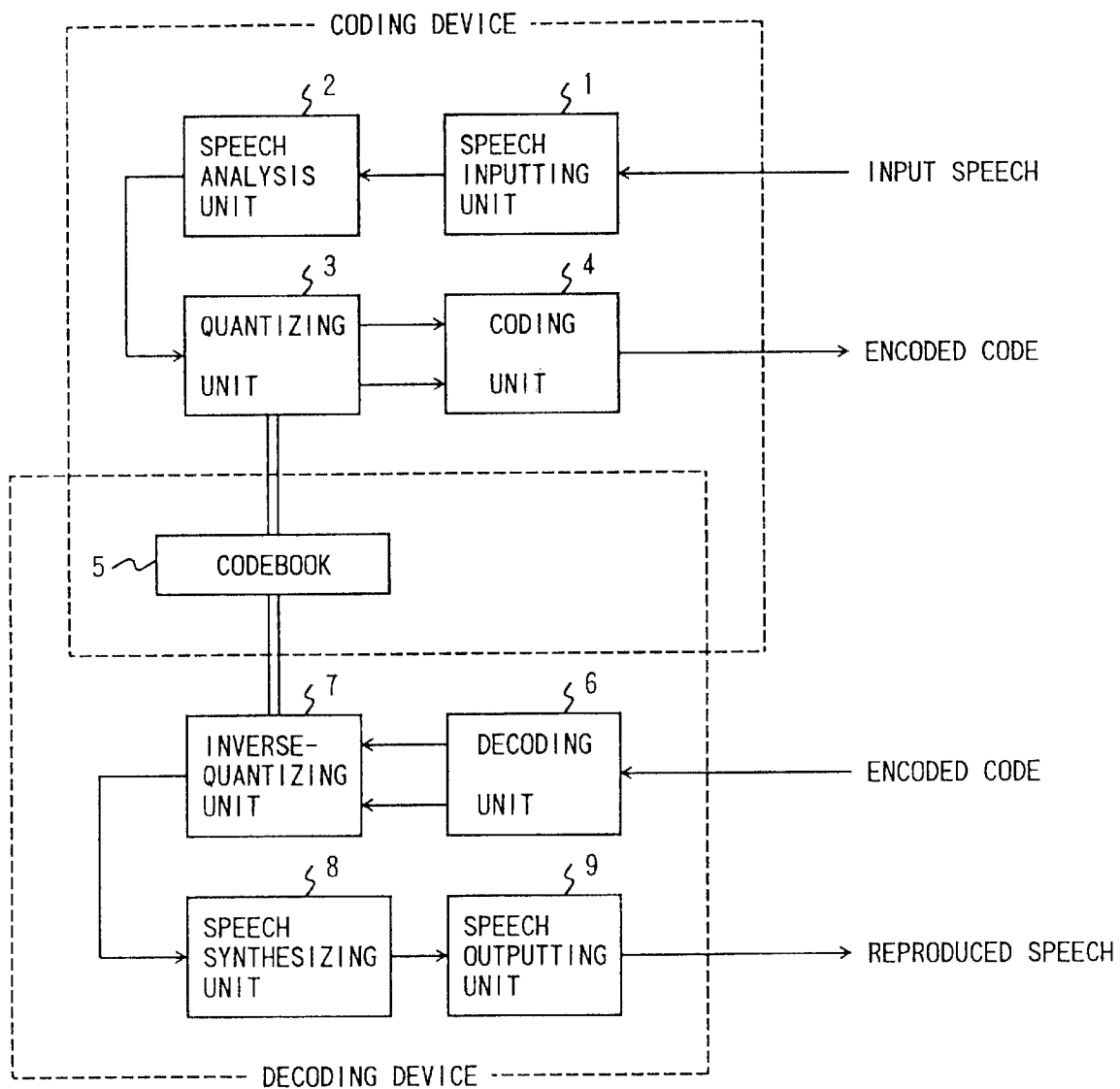
FIG. 1 is a block diagram of a speech coding/decoding device of the prior art which encodes and decodes speech information by using a codebook.
Figure 3:
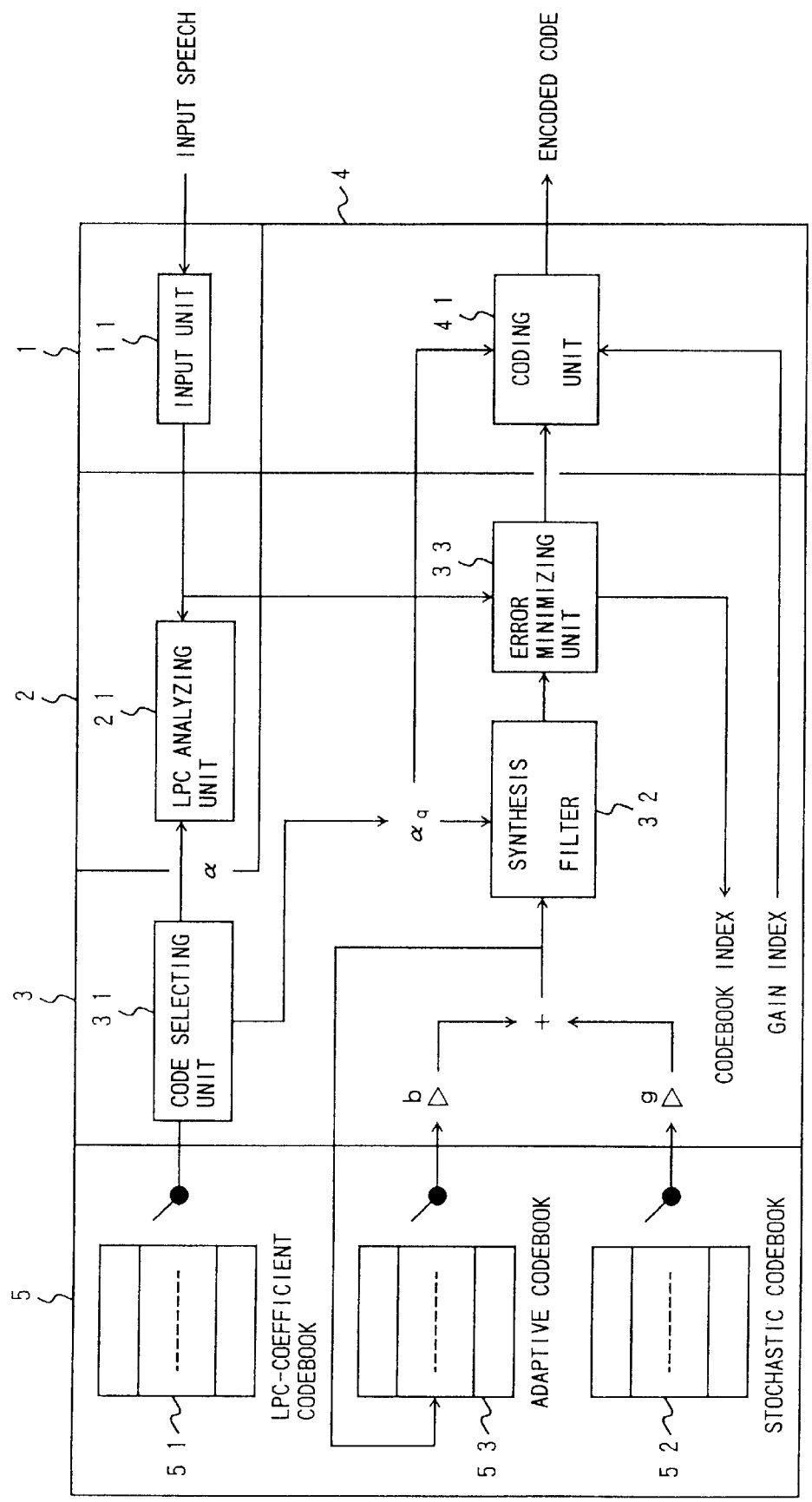
FIG. 3 is a block diagram of an example of a speech coding device which employs the CELP method.

FIG. 9A is a block diagram of an example of a speech coding device according to the present invention.

The speech coding device of FIG. 9A includes the speech inputting unit 1 for inputting speech, the speech analysis unit 2 for analyzing the input speech received by the speech inputting unit 1, the codebook 5 for storing representative vectors, the quantizing unit 3 for quantizing results of the input-speech analysis based on the codebook 5, a speech dictionary 10 for representing speech patterns based on the codebook 5, and a matching unit 11 for matching the input speech with the speech dictionary 10 by using one of the analysis results from the speech analysis unit 2, the quantization parameters from the quantizing unit 3, and the quantization codes from the quantizing unit 3.

With this configuration, the codebook provided for a speech coding purpose can also be used as a speech dictionary for speech recognition, thereby achieving a reduction in memory volume.

FIG. 9B is a block diagram of an example of a speech decoding device according to the present invention.

The speech decoding device of FIG. 9B includes the codebook 5 for storing the representative vectors, the inverse-quantizing unit 7 for searching for the quantization parameters by looking up the codebook 5 based on received quantization codes (encoded codes), the speech synthesizing unit 8 for synthesizing speech based on the quantization parameters after the inverse quantization in the inverse-quantizing unit 7, the speech dictionary 10 for representing speech patterns by using the codebook 5, and the matching unit 11 for matching the received quantization codes with the speech dictionary 10 by using the quantization codes or the quantization parameters from the inverse-quantizing unit 7.

With this configuration, the codebook provided for a speech decoding purpose can also be used as a speech dictionary for speech recognition, thereby achieving a reduction in memory volume. Also, this configuration is able to boost a speech-recognition rate because the speech recognition is carried out by matching the quantization codes or the quantization parameters without reproducing original speech from the received signals.

Also, according to the present invention, a speech coding/decoding device is structured as a combination of FIG. 9A and FIG. 9B, including the speech inputting unit for inputting speech, the speech analysis unit for analyzing the input speech received by the speech inputting unit, the codebook for storing representative vectors, the quantizing unit for quantizing results of the input-speech analysis based on the codebook, the inverse-quantizing unit for searching for the quantization parameters by looking up the codebook based on received quantization codes, the speech synthesizing unit for synthesizing speech based on the quantization parameters after the inverse quantization in the inverse-quantizing unit, the speech dictionary for representing speech patterns by using the codebook, and the matching unit for matching the input speech or the received quantization codes with the speech dictionary. The matching unit matches the input speech with the speech dictionary by using one of the analysis results from the speech analysis unit, the quantization parameters from the quantizing unit, and the quantization codes from the quantizing unit. Further, the matching unit matches the received quantization codes with the speech dictionary by using the quantization codes or the quantization parameters from the inverse-quantizing unit.

With this configuration, the codebook is shared in use for the speech coding purpose and the speech decoding purpose, and can also be used as the speech dictionary for speech recognition, thereby achieving a significant reduction in required memory volume.

Further, if a speech-dictionary generating unit is provided to generate the speech dictionary based on the quantization parameters obtained through quantizing the results of the input-speech analysis, an operator can register his/her own speech, thereby enhancing a speech-recognition rate.

Further, if a speech-dictionary generating unit is provided to generate the speech dictionary based on the received quantization codes or the quantization parameters obtained after the inverse-quantizing unit applies inverse-quantization to the quantization codes, an operator can register his/her own speech through a telephone line, thereby enhancing a speech-recognition rate.

Further, if an analysis-condition changing unit is provided to change analysis conditions of the speech analysis unit between the time of speech coding and the time of speech recognition, coding efficiency can be boosted in a coding mode by elongating intervals for analysis, while a recognition rate can be enhanced in a recognition mode by shortening the intervals.

Further, if a speech checking unit is provided to check results of the quantization in the quantizing unit, with a mechanism for forgoing the speech recognition in the matching unit when analysis results are found to correspond to noise in the codebook according to check results, an excessive process can be omitted in the recognition mode, thereby achieving efficient speech recognition.

Further, if a high-speed RAM is provided, the speech dictionary can be kept in an external low-speed RAM, and can be transferred from the external low-speed RAM to the high-speed RAM when required for speech recognition Also, this high-speed RAM can be used as a work area at the time of a speech coding/decoding operation. In this manner, such a high-seed RAM, if provided, can be shared by the coding/decoding device and the recognition device, thereby making efficient use of the memory.

In the following, embodiments of the present invention will be described with reference to the accompanying drawings.

FIGS. 10A and 10B are illustrative drawings for explaining a schematic configuration of a digital mobile phone to which the speech processing device of the present invention is applied.

As shown in FIG. 10A, in terms of its appearance, the mobile phone is provided with an antenna, a speaker, a display, a key pad, a microphone, etc. As shown in FIG. 6B, the internal configuration includes a speech coding/decoding/recognition unit implemented by using the speech processing device of the present invention, a control unit, a modulation unit, a demodulation unit, a transmitting unit, and a receiving unit. In this mobile phone, an speech input is given to the microphone, and speech reproduced by the speech coding/decoding/recognition unit is vocalized by the speaker Matching results are shown on the display (display panel for showing a dial number, etc.), for example, to wait for a button to be pressed for confirmation Inputs to the control unit can be made by using the dial buttons, for example, which are also used for dialing a phone number. Through such inputs, a speech coding/decoding mode and a speech recognition mode can be switched. A coded speech signal obtained by the speech coding/decoding/recognition unit is modulated by the modulation unit, and, then, is transmitted over the air by the transmitting unit using the antenna. Also, a radio signal received by the antenna is demodulated to a coded speech signal, which is then input to the speech coding/decoding/recognition unit.

Figure 11:
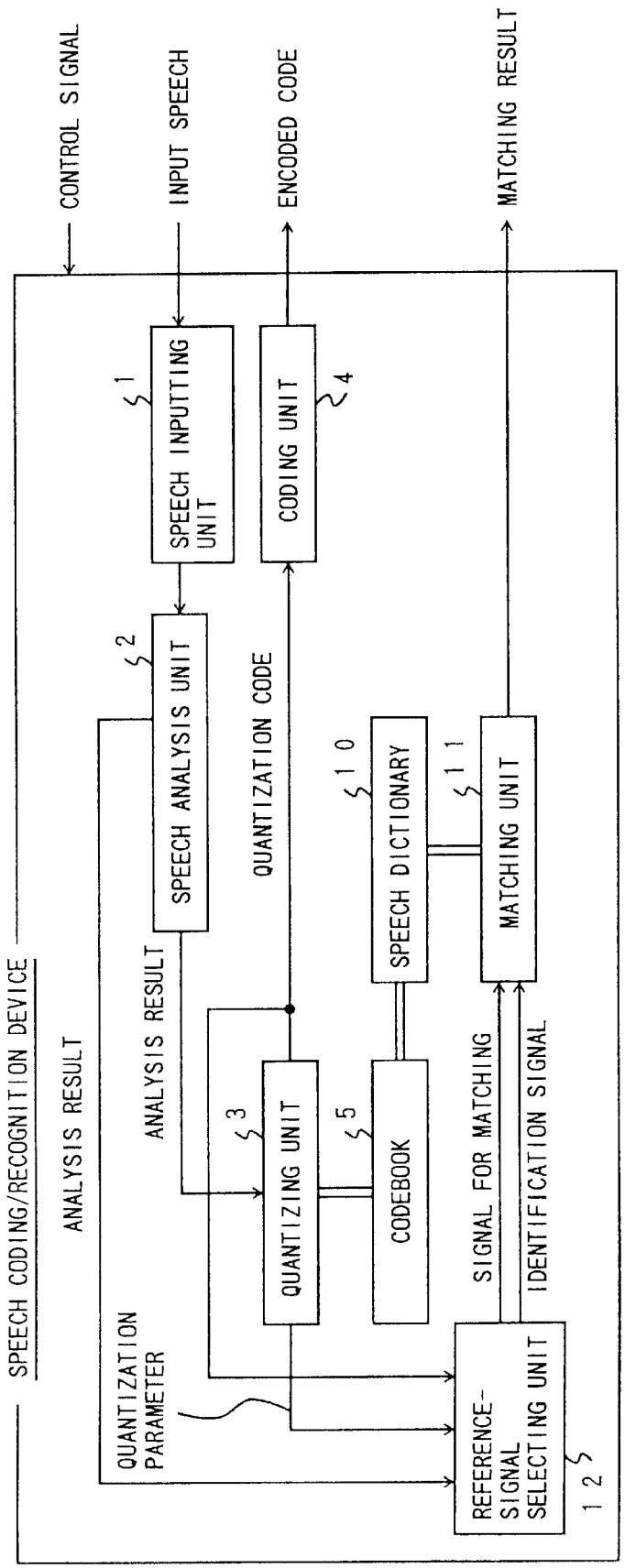
FIG. 11 is a block diagram of a speech coding/recognition device according to an embodiment of the present invention.

FIG. 11 is a block diagram of a speech coding/recognition device according to an embodiment of the present invention In this embodiment, the speech coding/recognition device is provided with a speech recognition function for recognizing anonymous speakers. An application for such a device may include the automatic dialing previously described.

Configurations of the speech inputting unit 1, the speech analysis unit 2, the quantizing unit 3, the coding unit 4, and the codebook 5 provided for the speech coding function is the same as those of the previously described prior art. The configuration of FIG. 11 differs from that of the prior art in that the speech dictionary 10, the matching unit 11, and a reference-signal selecting unit 12 are provided in order to provide a speech recognition function.

In this embodiment, the codebook 5 conventionally used in the speech coding/decoding device is also used as the speech dictionary 10 for providing the speech recognition function. The speech coding/decoding device quantizes LPC coefficients or the like by using the codebook 5 in order to encode input speech signals. The speech dictionary 10 used for the speech recognition in this embodiment utilizes this codebook 5, and contains series of quantization codes of the codebook 5 as registered words. The speech dictionary 10 containing the series of the quantization codes can be implemented by using a smaller amount of memories compared to a traditional speech dictionary which stores LPC coefficients themselves.

Figure 12B:
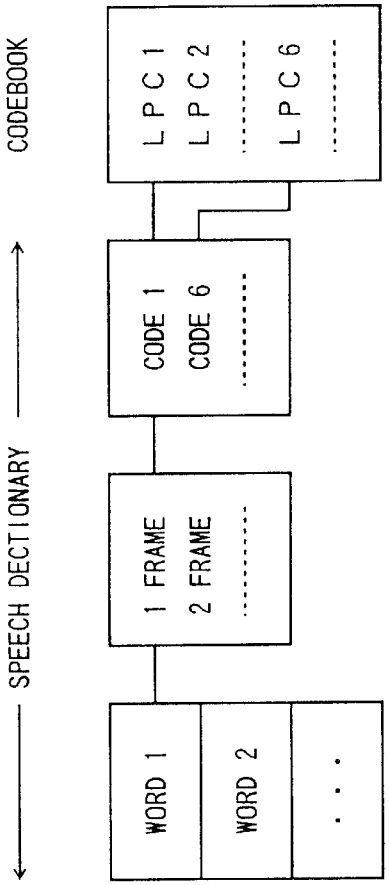
FIGS. 12A and 12B are illustrative drawings showing an example of a structure of the speech dictionary 10.
Figure 12A:
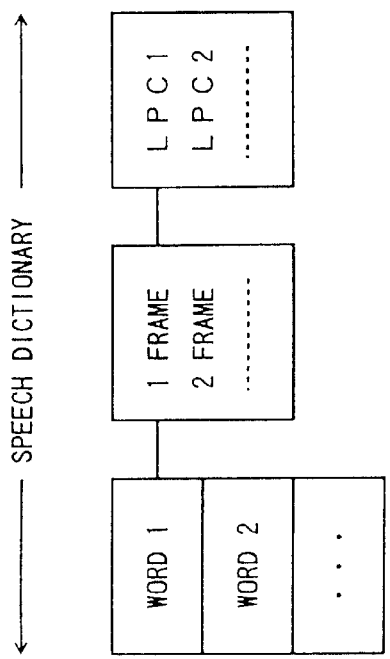

FIGS. 12A and 12B are illustrative drawings showing examples of structures of speech dictionaries. In the prior-art speech dictionary used for speech recognition shown in FIG. 12A, a registered word (e.g., a name like "Mr. Yamada" for the automatic speech dialing) is represented by series of LPC coefficients (values themselves of these coefficients) or the like obtained for respective frames after breaking down the word into a plurality of frames of a predetermined length. On the other hand, in the speech dictionary 10 of the present invention shown in FIG. 12B, a registered word is represented by series of quantization codes (indexes) corresponding to LPC coefficients obtained for respective frames after breaking down the word into a plurality of frames of a predetermined length. When series of the LPC coefficients corresponding to a given registered word is necessary, series of the quantization codes of that registered word are used for extracting the series of the LPC coefficients from the codebook.

The reference-signal selecting unit 12 is used for selecting input speech information which is to be matched with a registered word of the speech dictionary 10 by the matching unit 11 at the time of speech recognition The reference-signal selecting unit 12 receives as input signals analysis results from the speech analysis unit 2, quantization parameters from the quantizing unit 3, and quantization codes from the quantizing unit 3. The analysis results are coefficient values obtained by the speech analysis unit 2 analyzing the input speech. The quantization parameters are coefficient values obtained by the quantizing unit 3 quantizing the analysis results based on the codebook 5. The quantization codes are index values indicating the quantization parameters in the codebook 5. The reference-signal selecting unit 12 selects one of these three input signals to supply the selected signal to the matching unit 11 along with an identification signal. The identification signal indicates whether the supplied signal is the analysis results, the quantization parameters, or the quantization codes.

When the supplied signal is the analysis results or the quantization parameters, the matching unit 11 extracts coefficient series from the codebook by using registered words (quantization code values) of the speech dictionary 10, and searches for coefficient series closest to the supplied signal to carry out speech recognition. When the supplied signal is the quantization codes, the matching unit 11 matches the supplies signal with registered words by using the code series of the speech dictionary 10 themselves (i.e., without extracting coefficient series from the codebook 5) to carry out speech recognition.

When the speech coding/recognition device of this embodiment operates in a decoding operation mode, a speech input to the speech inputting unit 1 is subjected to an LPC analysis, for example, in the speech analysis unit 2. The quantizing unit 3 then searches in the codebook 5 for a pattern closest to results of the analysis to obtain quantization codes. The quantization codes are then multiplexed by the coding unit 4 to be output.

In a recognition operation mode, the reference-signal selecting unit 12 selects one of the results obtained from the analysis of the input speech, the quantization parameters, and the quantization codes. Then, the matching unit 11 matches the selected one of these with registered words of the speech dictionary 10 prepared in advance, and outputs a result of the matching process. When the input speech is recognized as one of the registered words, a telephone number corresponding to the recognized one of the registered words is searched for in the case of the automatic speech dialing, for example, and the searched number is automatically dialed to make a call.

Figure 13:
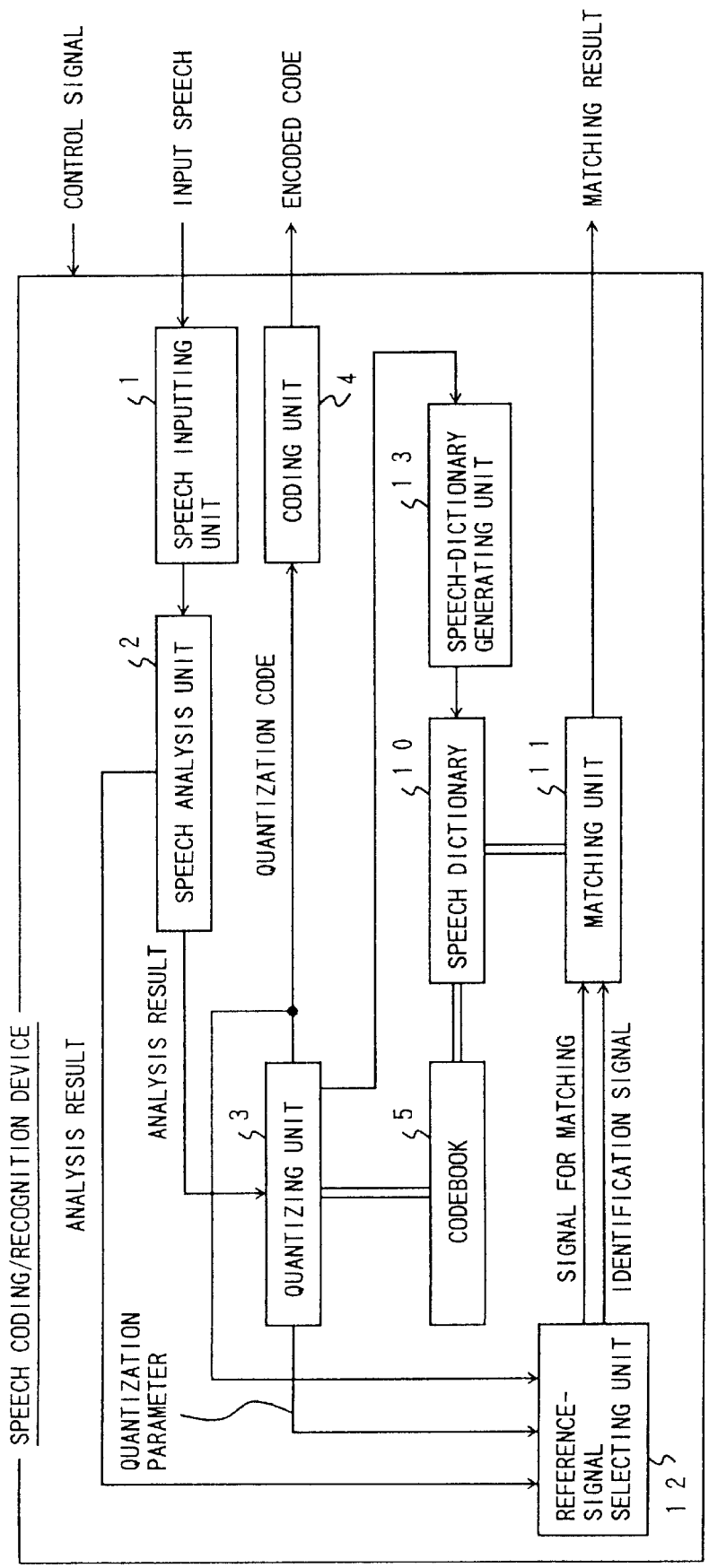
FIG. 13 is a block diagram of another embodiment of a speech coding/recognition device according to the present invention.

FIG. 13 is a block diagram of another embodiment of a speech coding/recognition device according to the present invention. In this embodiment, the speech coding/recognition device is provided with a speech recognition function for a specific speaker. An application for such a device may include automatic dialing based on the speech recognition.

Configurations of the speech inputting unit 1, the speech analysis unit 2, the quantizing unit 3, the coding unit 4, the codebook 5, the speech dictionary 10, the matching unit 11, and the reference-signal selecting unit 12 in FIG. 13 are the same as those of the previously described prior art. The configuration of FIG. 13 differs from that of the prior art in that a speech-dictionary generating unit 13 is additionally provided. The speech-dictionary generating unit 13 generates a speech dictionary by registering quantization codes in the codebook corresponding to quantization parameters which are obtained by quantizing results of analysis of input speech in the same manner as in the case of the matching process. In this manner, the speech of a user can be registered to enhance a recognition rate.

Basic operations in the coding operation mode and the recognition operation mode are the same as those of the previous embodiment, and a description thereof will be omitted. In this embodiment, registered words in the speech dictionary 10 are recorded by using the speech of the user, so that the recognition rate is enhanced as mentioned above.

Figure 14:
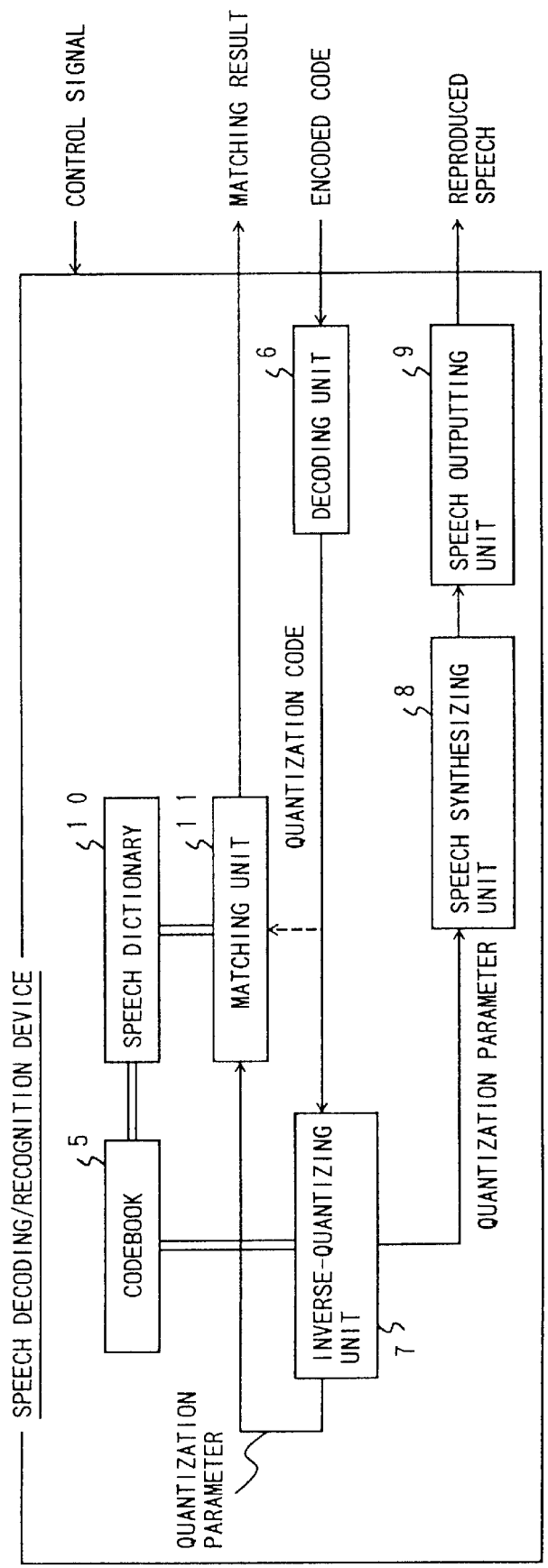
FIG. 14 is a block diagram of a speech decoding/recognition device according to an embodiment of the present invention.

FIG. 14 is a block diagram of a speech decoding/recognition device according to an embodiment of the present invention. In this embodiment, the speech decoding/recognition device is provided with a speech recognition function for anonymous speakers. An application for such a device may include use of the device as a speech recognition server. For example, the speech decoding/recognition device of this embodiment may be installed as a server in an office, and a mobile telephone is used for accessing the office from outside. Recognizing and confirming coded speech, the server can be used for purposes such as giving speech instructions for various controls over the telephone line.

In FIG. 14, configurations of the decoding unit 6, the inverse-quantizing unit 7, the speech synthesizing unit 8, and the speech outputting unit 9 are the same as those described in connection with the prior-art speech decoding device, and the only differences are that the configuration of FIG. 14 is provided with the speech dictionary 10 and the matching unit 11. The speech dictionary 10 and the matching unit 11 are the same as those used in the speech coding/recognition device described above.

When the speech decoding/recognition device of this embodiment operates in a decoding operation mode, the decoding unit 6 extracts quantization codes from encoded codes transmitted from a coding device, and the inverse-quantizing unit 7 extracts quantization parameters from the codebook 5 by applying the inverse-quantization process to the quantization codes. Using the quantization parameters, the speech synthesizing unit 8 synthesizes speech, and the speech outputting unit 9 outputs the reproduced speech.

In a recognition operation mode, the matching unit 11 matches the quantization parameters obtained by the inverse-quantization process in the inverse-quantizing unit 7 with the speech dictionary 10 created in advance. In this case, the speech dictionary 10, by accessing the codebook 5, provides the matching unit 11 with coefficient series corresponding to registered words (code format). In this manner, the input speech is recognized.

In this embodiment, the input signal to the matching unit 11 is the quantization parameters obtained through the inverse-quantization process. However, the present invention is not limited to this configuration. The quantization codes from the decoding unit 6 may be input to the matching unit 11 so that the matching unit 11 directly matches the quantization codes with codes of the registered words to search for the closest one.

FIG. 15 is a block diagram of another embodiment of a speech decoding/recognition device according to the present invention. In this embodiment, the speech decoding/recognition device is provided with a speech recognition function for a specific speaker. A field of application for such a device may include the use of the device as a speech recognition server. For example, the speech decoding/recognition device of this embodiment may be installed as a server in an office, and a mobile telephone is used for accessing the office from outside to use the server for recognizing coded speech.

In FIG. 15, configurations of the decoding unit 6, the inverse-quantizing unit 7, the speech synthesizing unit 8, the speech outputting unit 9, the speech dictionary 10, and the matching unit 11 are the same as those described in connection with the speech decoding/recognition device of the previously described embodiment. The only difference is in that the speech-dictionary generating unit 13 is additionally provided, and the speech-dictionary generating unit 13 is the same as that used in the speech coding/recognition device previously described. The speech-dictionary generating unit 13 generates a speech dictionary by providing correspondence between the codebook and quantization parameters obtained through the inverse-quantization process in the same manner as in the case of the matching process. In this manner, the speech of a user can be registered through the telephone line to enhance the recognition rate.

Basic operations of the speech decoding/recognition device of FIG. 15 in the decoding operation mode and the recognition operation mode are the same as those of the speech decoding/recognition device of the previously described embodiment, and a description thereof will be omitted.

FIG. 16 is a block diagram of an embodiment of a speech coding/decoding/recognition device according to the present invention. In this embodiment, the speech coding/decoding/recognition device is provided with a speech recognition function for anonymous speakers. An application for such a device may include use of the device for bilateral speech recognition, for the automatic speech dialing, and as the speech recognition server in mobile telephones or the like.

A configuration of FIG. 16 is a combination of the speech coding/recognition device of FIG. 11 and the speech decoding/recognition device of FIG. 14. A newly introduced configuration is that quantization parameters are input to the reference-signal selecting unit 12 from the inverse-quantizing unit 7. When speech information received through the telephone line is to be recognized, the reference-signal selecting unit 12 selects the inverse-quantization parameters from the inverse-quantizing unit 7, and supplies them to the matching unit 11.

Basic operations of the speech coding/decoding/recognition device in the coding operation mode, the decoding operation mode, and the recognition operation mode are the same as those of the previously described embodiments, and a description thereof will be omitted.

Figure 17:
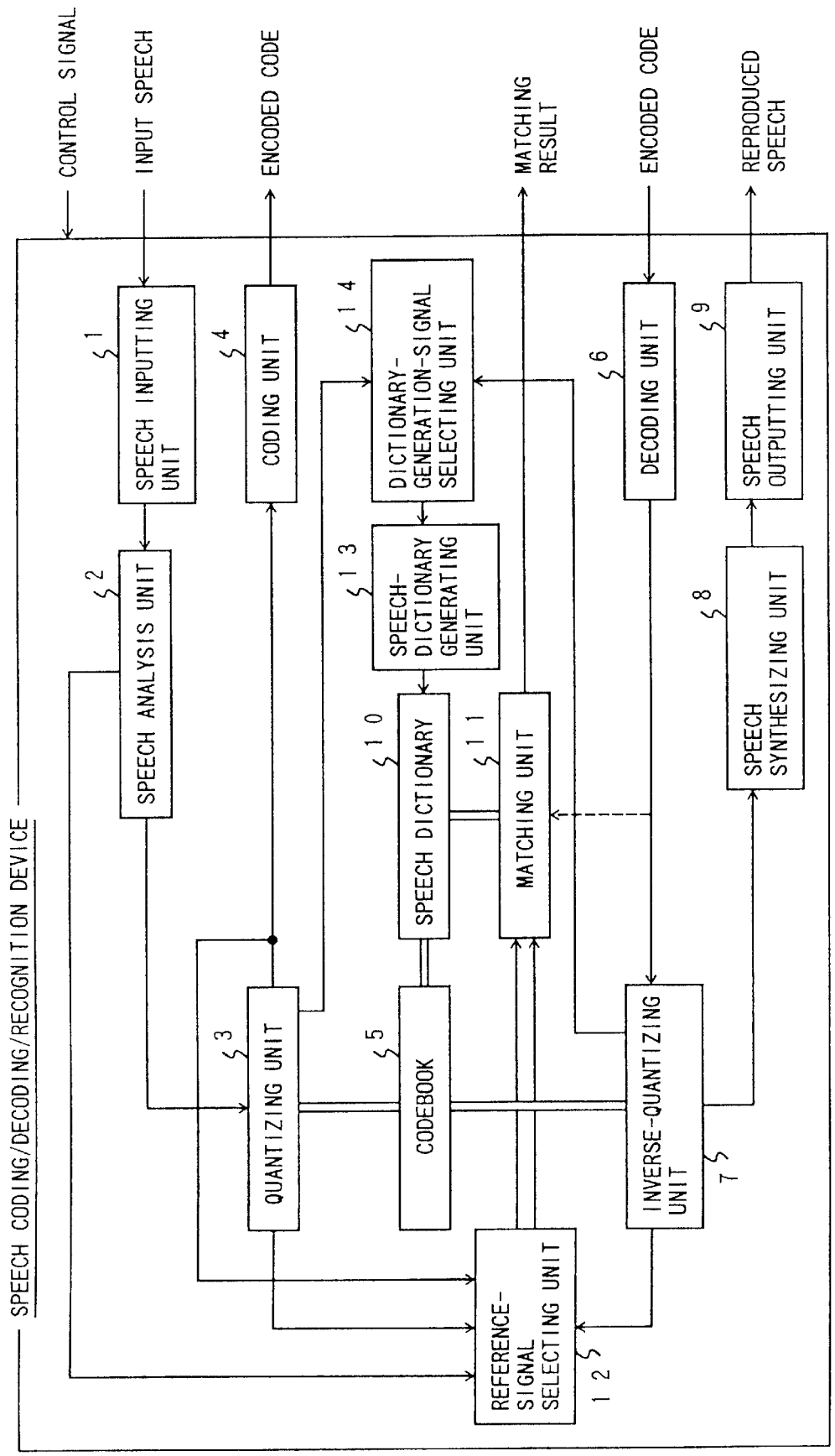
FIG. 17 is a block diagram of another embodiment of a speech coding/decoding/recognition device according to the present invention.

FIG. 17 is a block diagram of another embodiment of a speech coding/decoding/recognition device according to the present invention. In this embodiment, the speech coding/decoding/recognition device is provided with a speech recognition function for a specific speaker. An application for such a device may include use of the device for bilateral speech recognition, for automatic speech dialing, and as the speech recognition server in mobile telephones or the like.

A configuration of this embodiment is a combination of the speech coding/recognition device of FIG. 13 and the speech decoding/recognition device of FIG. 15. A newly introduced configuration is that a dictionary-generation-signal selecting unit 14 is additionally provided. The dictionary-generation-signal selecting unit 14 selects quantization parameters from the quantizing unit 3 when a user of a telephone with this speech coding/decoding/recognition device registers words in the dictionary, and selects quantization parameters from the inverse-quantizing unit 7 when a user registers words in the dictionary over the telephone line. The selected quantization parameters are supplied to the speech-dictionary generating unit 13. The speech-dictionary generating unit 13 matches the codebook 5 with the quantization parameters obtained by analyzing the input speech or the quantization parameters obtained through the inverse quantization, and generates a speech dictionary In this manner, the speech of a user can be registered through the telephone line to enhance the recognition rate.

Basic operations of this speech coding/decoding/recognition device in the coding operation mode, the decoding operation mode, and the recognition operation mode are the same as those of the previously described embodiments, and a description thereof will be omitted.

Figure 18:
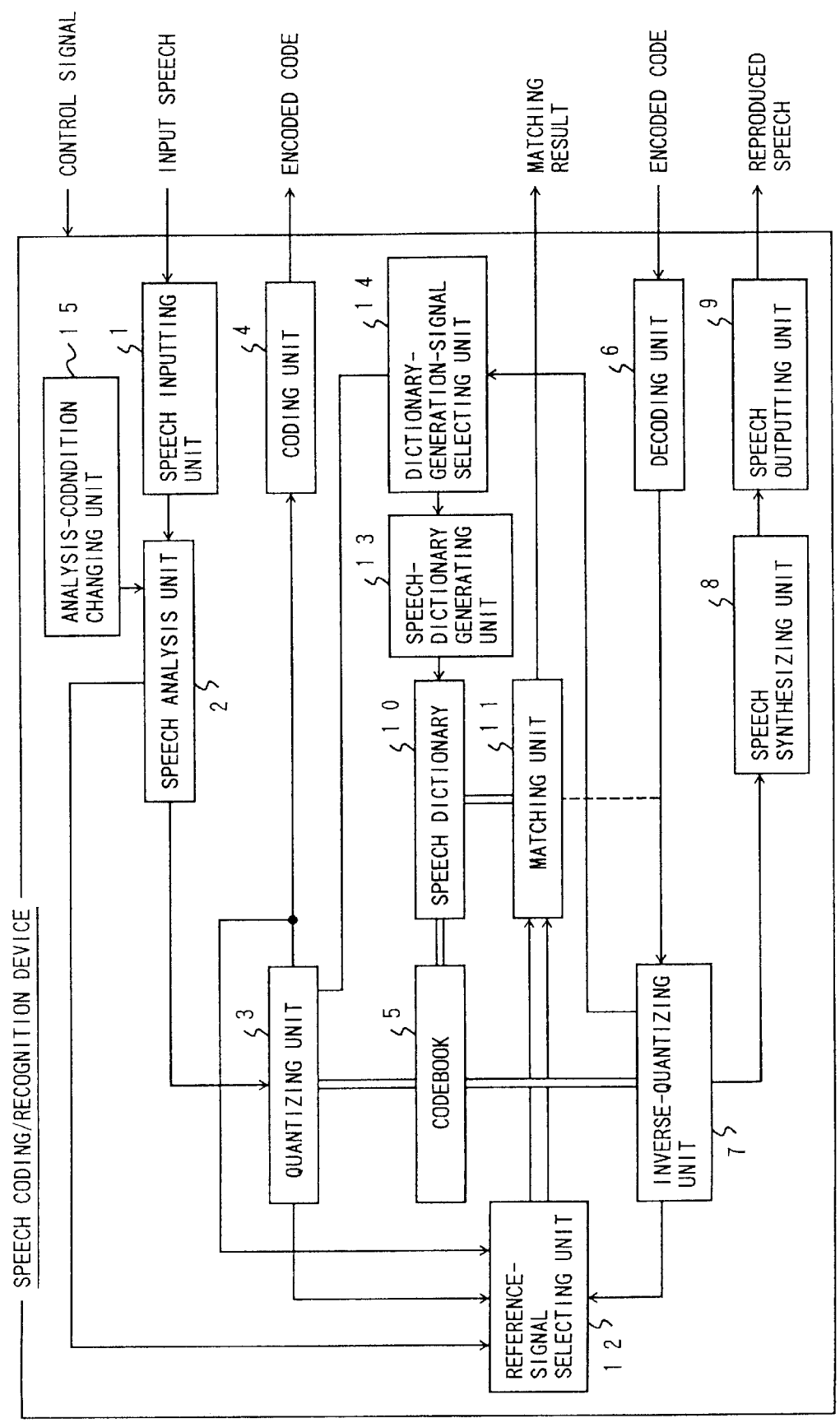
FIG. 18 is a block diagram of still another embodiment of a speech coding/decoding/recognition device according to the present invention.

FIG. 18 is a block diagram of still another embodiment of a speech coding/decoding/recognition device according to the present invention. In this embodiment, the speech coding/decoding/recognition device is provided with a speech recognition function for a specific speaker. An application for such a device may include the use of the device for bilateral speech recognition, for automatic speech dialing, and as the speech recognition server in mobile telephones or the like.

A basic configuration of this embodiment is the same as that of the embodiment shown in FIG. 17, but differs in that an analysis-condition changing unit 15 is provided. The analysis-condition changing unit 15, when the input speech is to be analyzed, changes conditions for the analysis (e.g., analysis intervals), depending on whether operating in the coding operation mode or in the recognition operation mode. With this function provided, for example, the analysis intervals may be elongated to boost a coding efficiency in the coding operation mode, and may be shortened to enhance a recognition rate in the recognition operation mode.

Basic operations of this speech coding/decoding/recognition device in the coding operation mode, the decoding operation mode, and the recognition operation mode are the same as those of the previously described embodiments, and a description thereof will be omitted.

The speech coding/recognition device, the speech decoding/recognition device, and the speech coding/decoding/recognition device described above can employ the CELP method, which is a standard speech coding method used in digital mobile phones. In this case, the use of LPC coefficients as parameters for speech recognition achieves a high recognition rate.

In general, speech recognition based on LPC coefficients boosts a recognition rate by often employing LPC cepstrum which has a smoother profile compared to the LPC coefficients. LPC coefficients provide a model of vocal-tract characteristics, and are effective parameters for representing vocalized portions. In terms of representing non-vocalized portions, the LPC coefficients are not sufficiently effective. In the speech coding/decoding device, not only the LPC coefficients but also other codes such as parameters (indexes) of the stochastic codebook and the adaptive codebook are transmitted, so that non-vocalized portions as well as vocalized portions are well represented by these codes. In general, however, only the LPC coefficients are used as parameters for speech recognition, and sufficient results are not obtained in terms of recognition of non-vocalized portions. This also applies in the above embodiments. Because of this reason, cepstrum which represents a spectrum envelope of input speech is often employed.

Since cepstrum and LPC cepstrum are well known technique, a detailed description thereof will be omitted. In the following, however, a method of obtaining cepstrum will be described.

Denoting LPC coefficients obtained for a given frame as $\alpha_1$ through $\alpha_n$, cepstrum $c_p$ (p=1, 2, ...) is represented as follows.

$$c_1 = -\alpha_1 \quad (1)$$

$$c_p = -\alpha_p - \sum_{m=1}^{p-1}(1 - m/p)\alpha_m c_{p-m} \quad (1 < p \leq n) \quad (2)$$

$$c_p = -\sum_{m=1}^{n}(1 - m/p)\alpha_m c_{p-m} \quad (n < p) \quad (3)$$

By using the LPC cepstrum $c_p$ obtained as shown above, a speech-recognition rate can be generally enhanced.

In the speech processing device according to the present invention, however, the speech dictionary used for speech recognition contains series of quantization codes as registered words, as shown in FIG. 12B. In order to use the LPC cepstrum for speech recognition in the speech processing device of the present invention, a parameter conversion function becomes necessary.

Figure 19:
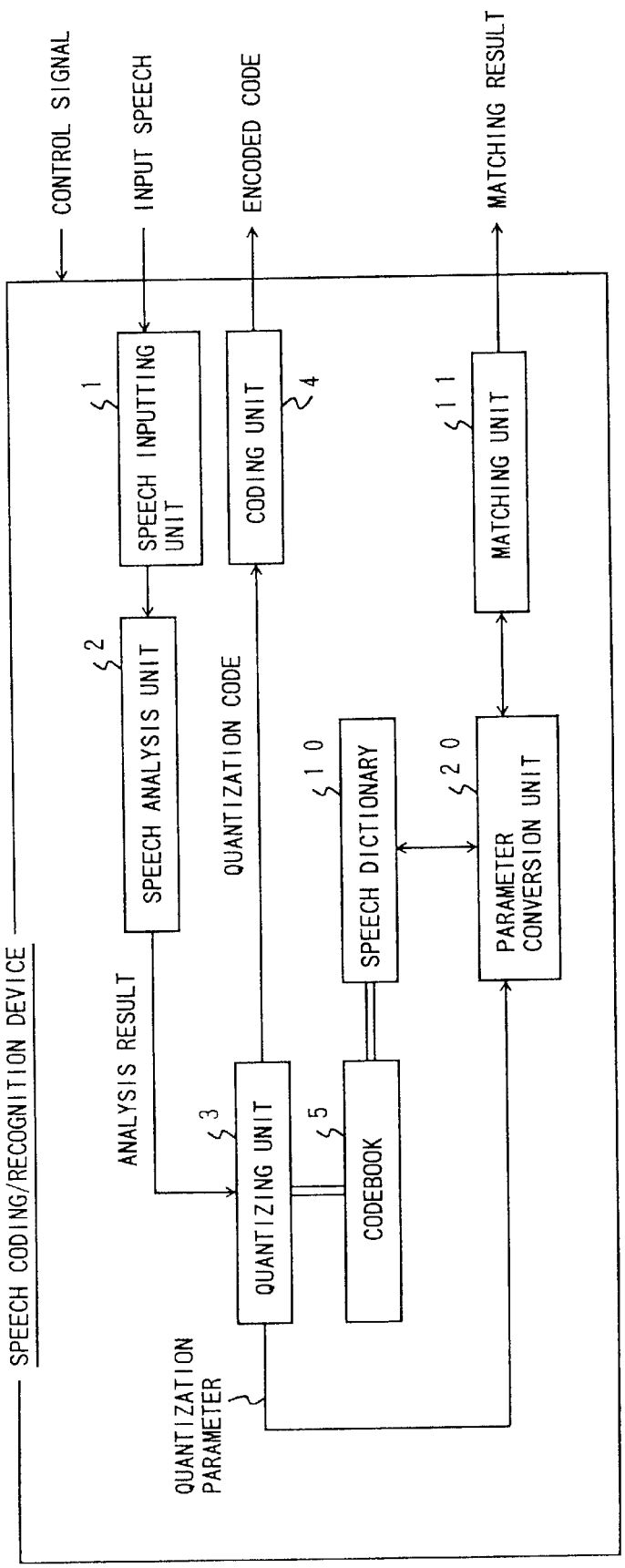
FIG. 19 is a block diagram of an embodiment of a speech coding/recognition device which uses LPC cepstrum for speech recognition according to the present invention.

FIG. 19 is a block diagram of an embodiment of a speech coding/recognition device which uses LPC cepstrum for speech recognition according to the present invention In FIG. 19, the same elements as those of FIG. 11 are referred to by the same numerals, and a description thereof will be omitted. The speech coding/recognition device of FIG. 19 differs from FIG. 11 in that the reference-signal selecting unit 12 is removed, and a parameter conversion unit 20 is newly provided.

When the speech coding/recognition device of FIG. 19 operates in the recognition mode, the parameter conversion unit 20 receives LPC coefficients of input speech from the quantizing unit 3, and obtains LPC cepstrum according to the equations (1) through (3). The obtained LPC cepstrum of the input speech is supplied to the matching unit 11. The matching unit 11 extracts series of LPC coefficients from the codebook 5 by using registered words (quantization code values) in the speech dictionary 10. The extracted series of LPC coefficients of the registered words are converted into LPC cepstrum by the parameter conversion unit 20 before being supplied to the matching unit 11. The matching unit 11 matches the LPC cepstrum of the registered words and the LPC cepstrum of the input speech. By searching for a registered word closest to the input speech, the matching unit 11 carries out speech recognition of the input speech.

In FIG. 19, an operation in the coding operation mode is the same as that of the previous embodiments, and a description thereof will be omitted.

Figure 20:
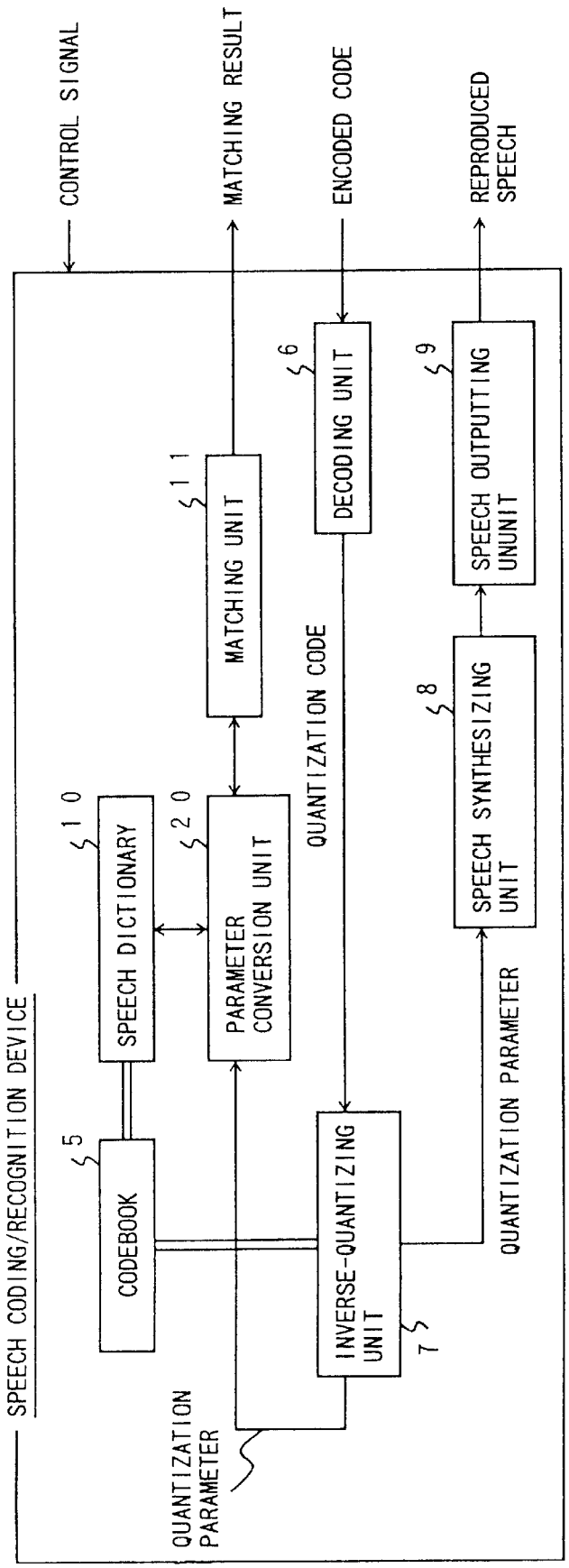
FIG. 20 is a block diagram of an embodiment of a speech decoding/recognition device which uses LPC cepstrum for speech recognition according to the present invention.

FIG. 20 is a block diagram of an embodiment of a speech decoding/recognition device which uses LPC cepstrum for speech recognition according to the present invention. In FIG. 20, the same elements as those of FIG. 14 are referred to by the same numerals, and a description thereof will be omitted. The speech decoding/recognition device of FIG. 20 differs from the speech decoding/recognition device of FIG. 14 in that the parameter conversion unit 20 is newly provided.

When the speech decoding/recognition device of FIG. 20 operates in the recognition mode, the parameter conversion unit 20 receives LPC coefficients (quantization parameters) corresponding to received encoded codes (quantization codes) from the inverse-quantizing unit 7, and obtains LPC cepstrum according to the equations (1) through (3). The obtained LPC cepstrum of the received encoded codes is supplied to the matching unit 11. The matching unit 11 extracts series of LPC coefficients from the codebook 5 by using registered words (quantization code values) in the speech dictionary 10. The extracted series of LPC coefficients of the registered words are converted into LPC cepstrum by the parameter conversion unit 20 before being supplied to the matching unit 11. The matching unit 11 matches the LPC cepstrum of the registered words and the LPC cepstrum of the received encoded codes. By searching for a registered word closest to the received speech signal (received encoded codes), the matching unit 11 carries out speech recognition of the received speech signal.

In FIG. 20, an operation in the decoding operation mode is the same as that of the previous embodiments, and a description thereof will be omitted.

Figure 21:
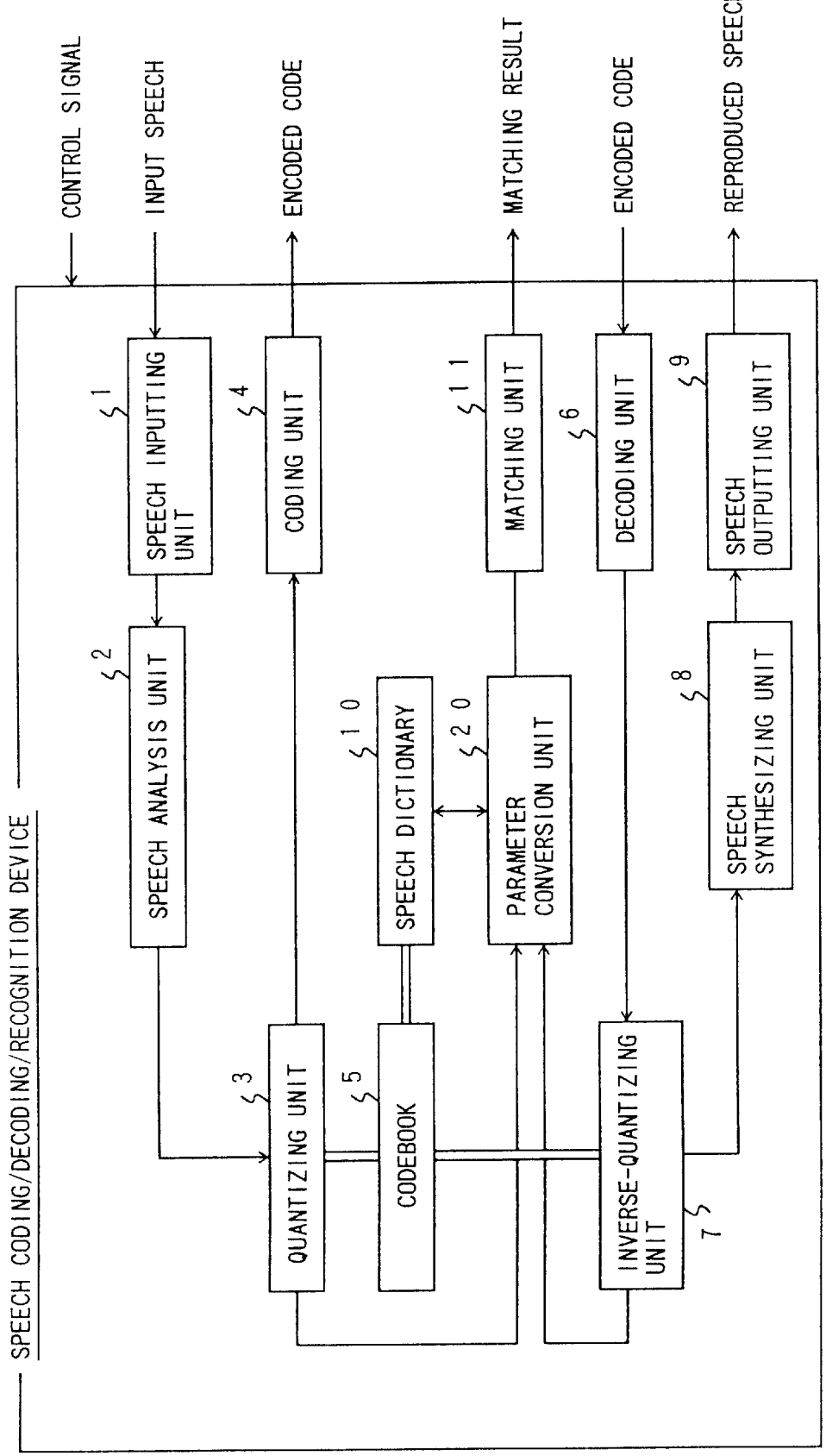
FIG. 21 is a block diagram of an embodiment of a speech coding/decoding/recognition device which uses LPC cepstrum for speech recognition according to the present invention.

FIG. 21 is a block diagram of an embodiment of a speech coding/decoding/recognition device which uses LPC cepstrum for speech recognition according to the present invention. In FIG. 21, the same elements as those of FIG. 16 are referred to by the same numerals, and a description thereof will be omitted. The speech decoding/recognition device of FIG. 21 differs from the speech decoding/recognition device of FIG. 14 in that the parameter conversion unit 20 is newly provided.

An operation of the speech coding/decoding/recognition device of FIG. 21 in the recognition operation mode is the same as that of FIG. 19 and FIG. 20 in the recognition operation mode, and a description thereof will be omitted. Further, operations in the coding/decoding operation modes are the same as those of FIG. 16, and a description thereof will be omitted.

As described in the above, the invention shown in the embodiments of FIG. 19 through FIG. 21 calculates LPC-cepstrum coefficients from LPC coefficients to carry out recognition based on the LPC-cepstrum coefficients in the recognition operation mode. Because of this, there is no need to store LPC cepstrum coefficients as was necessary in the prior art. Also, the coding/decoding unit and the recognition unit share the LPC coefficients so as to reduce a used memory volume compared to the prior-art technique.

FIG. 22 is a chart showing comparisons between a prior-art configuration, a configuration in which the LPC coefficients of the codebook are shared, and a configuration in which the LPC coefficients of the codebook are shared and the parameter conversion is conducted at the time of recognition. In FIG. 22, recognition performance represents an evaluation of a recognition rate based on a rate of recognition failure, and used memory volume represents an evaluation of an increase in memory volume when a recognition device is added to a coding/decoding device. The symbol "○" indicates either a high recognition rate or a small increase in memory volume, and the symbol "X" means either a low recognition rate or a large increase in memory volume. The symbol "Δ" represents an evaluation of a mediocre level. As shown in FIG. 22, the configuration with shared LPC coefficients of the codebook and with the parameter conversion at the time of recognition has a small increase in memory volume and a high recognition rate.

As previously described in connection with problems of the prior-art technique, a registered word obtained as a result of speech recognition should be indicated by speech, in order to enhance convenience of digital mobile phones or the like with the automatic dialing function. If a speech synthesizing unit is simply incorporated into a device having a speech coding/decoding function and a speech recognition function, such a straightforward incorporation may entail a cost increase.

Accordingly, a speech synthesizing function used for recognition results needs to be efficiently incorporated into the speech processing device which has both the speech coding/decoding function and the speech recognition function implemented by using a small memory volume. In what follows, a description will be given with regard to a configuration for incorporating a speech synthesizing function without a significant increase in used memory volume into the speech processing device in which the codebook is shared according to the present invention, such a speech synthesizing function being used for synthesizing registered words in the dictionary.

Figure 23:
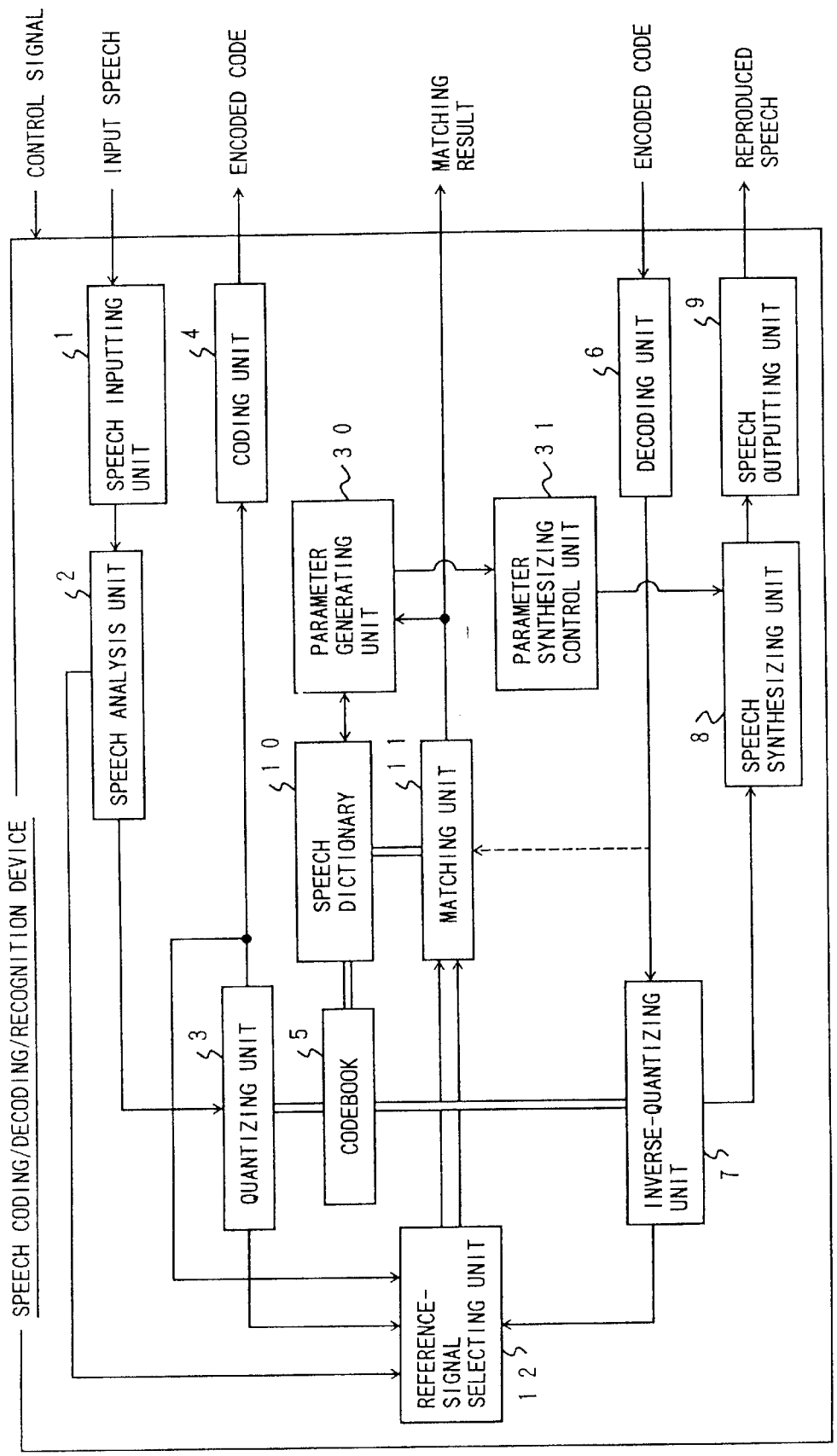
FIG. 23 is a block diagram of a configuration in which a speech synthesizing function for registered words in the dictionary is incorporated into the speech coding/decoding/recognition device of the present invention.

FIG. 23 is a block diagram of a configuration in which a speech synthesizing function for registered words in the dictionary is incorporated into the speech coding/decoding/recognition device of the present invention. In FIG. 23, the same elements as those of FIG. 16 are referred to by the same numerals, and a description thereof will be omitted. The speech coding/decoding/recognition device of FIG. 23 has a parameter generating unit 30 and a parameter synthesizing control unit 31 newly added to the speech coding/decoding/recognition device of FIG. 16.

When the speech coding/decoding/recognition device of FIG. 23 operates in the speech recognition mode, the reference-signal selecting unit 12 selects one of the results obtained from analysis of input speech, the quantization parameters, and the quantization codes. Then, the matching unit 11 matches the selected information with registered words of the speech dictionary 10 prepared in advance, and outputs a result of the matching process. Based on the result of the matching, the parameter generating unit 30 extracts parameters (LPC coefficients) necessary for synthesizing speech from the codebook 5 by using the speech dictionary 10, and generates other necessary parameters. The parameter synthesizing control unit 31 receives the parameters necessary for synthesizing a speech from the parameter generating unit 30, and supplies these parameters to the speech synthesizing unit 8 according to an agreed control procedure and in an agreed format in which the speech synthesizing unit 8 can use these parameters for synthesizing speech in the same manner as in the case when the speech synthesizing unit 8 receives parameters from the inverse-quantizing unit 7. The speech synthesizing unit 8 synthesizes a speech signal of the matched registered word based on these parameters. The speech outputting unit 9 outputs a speech by using the speech signal.

In the case of speech dialing, for example, a user confirms the vocalized registered word before retrieving a corresponding telephone number to make a call. Since the matching result is reproduced as speech, there is no need to indicate the matching result from the matching unit 11 on a display or the like of the mobile phone. It is obvious that a display function can be additionally used for a visual confirmation.

FIG. 24 is a table chart showing an example of indexes corresponding to parameters which are generated or extracted from the speech dictionary 10 by the parameter generating unit 30 of FIG. 23.

As for the adaptive codebook, it is used for representing highness (height) and pitch of a speech, so that the index i and the gain index b of the adaptive codebook are not given high priority in speech reproduction Even if the index i and the gain index b of the codebook are fixed, the only change observable in speech outputs is that the speech outputs become monotonous with a constant speech pitch, which will not disturb a user when the user recognizes the reproduced speech. In consideration of this, the index i and the gain index b regarding the adaptive codebook are generated by the parameter generating unit 30 as appropriate constant values.

As for the stochastic codebook, it is used for representing noise components corresponding to consonants, so that the index j with regard to the stochastic codebook can be randomly generated without causing a problem. On the other hand, the gain index g of the stochastic codebook is important information, representing the power of speech outputs. Because of this, generation of the gain index g is difficult, and the parameter generating unit 30 holds data of the gain index g in advance Appropriate gain indexes g are then selected based on LPC coefficients extracted from the speech dictionary 10.

In this manner, the parameter generating unit 30 generates indexes of parameters as shown in FIG. 24, and, then, reads the parameters corresponding to these indexes from the codebook 5 to supply these parameters to the parameter synthesizing control unit 31. The parameter synthesizing control unit 31 in turn supplies these parameters of frame 1, frame 2 and so on to the speech synthesizing unit 8 in a time order of each frame.

In this manner, the speech processing device equipped with the speech coding/decoding/recognition function as shown in FIG. 24 synthesizes speech of a registered word by using internally generated parameters as well as LPC coefficients which correspond to this registered word and extracted from the codebook when this registered word is obtained as a recognition result that matches input speech. Confirmation of recognition results thus can be made through reproduced speech sound at the time of automatic dialing, thereby providing a user-friendly interface while sustaining an increase in the memory volume to a minimum level.

In the above embodiment, the gain index i with regard to the adaptive codebook is fixed. However, the gain index i may be changed and controlled to obtain a better quality of reproduced speech. Since the gain index i represents speech pitch, use of appropriate gain indexes i makes reproduced speech sound closer to human speech.

A method of controlling the gain index i includes making a check based on LPC coefficients as to whether a synthesized portion is a vocalized portion or a non-vocalized portion. If a results of the check indicates that the synthesized portion is a vocalized portion, the pitch (gain index) i is set to 20, for example. If the synthesized portion is a non-vocalized portion, the pitch i is set to 1, for example. This check can be made by using reflection coefficients K obtained from the LPC coefficients.

The reflection coefficient $K_m$ of an m-th order is obtained as:

$$K_m = \alpha_m^m \quad (4)$$

$$\alpha_i^{m-1} = (\alpha_i^m - K_m \alpha_{m-1}^m)/(1-(K_m)^2) \quad (5)$$

where $\alpha_i^m$ is an LPC coefficient of a first order at an m-th step, and an order of an obtained reflection coefficient corresponds to one of the steps. As each step is calculated, α is updated. In this case, α is already obtained, so that reflection coefficients can be obtained by descending order in a recursive manner. If the reflection coefficient of the first order $K_1$ is greater than zero, the synthesized portion is ascertained as a vocalized portion If this coefficient $K_1$ is smaller than zero, the synthesized portion is ascertained as a non-vocalized portion.

By controlling the speech pitch as described above, the speech processing device equipped with the coding/decoding/recognition function of the present invention can synthesize speech of a registered word in the dictionary as being closer to real human speech.

In implementation of the present invention, various modifications can be made. For example, the codebook for speech recognition and speech coding/decoding may be used only with respect to speech inputs when used in the speech recognition, and may be used not only with respect to speech inputs but also with respect to any other sounds (e.g., background noise, music, etc.) when used for the speech coding/decoding As can be seen, there are a variety of signals treated by the coding table, so that when the codebook is designed to be used for both the speech recognition purpose and the speech coding/decoding purpose, the codebook ends up containing an excessively large amount of information for use in the speech recognition. It is thus preferable to equip the speech dictionary with a function to use only a limited portion of the codebook (i.e., portion of the speech information), because it can shorten a search time required for the speech recognition. In addition, a speech checking unit may be provided to check quantization results obtained by the quantizing unit, for example. When the quantization results are found by the check to correspond to a noise portion of the codebook, the speech recognition process in the matching unit may be omitted because the input is not likely a speech.

Further, the following configuration may be used as another variation of the speech coding/decoding/recognition device. It is generally preferable to store the speech dictionary in a high-speed RAM in order to boost a processing speed of the speech recognition, but there is no such a need for speech coding/decoding. Since the purpose of sharing the codebook in the speech coding/decoding device and the speech recognition device is to save memory volume, however, it is also preferable to share such a high-speed RAM. Since the recognition function and the coding/decoding function do not operate simultaneously, it is possible to alternately use the same high-speed RAM between these functions to make an efficient use of memories. In an exemplary configuration, a low-speed RAM for storing the speech dictionary is externally provided. At the time of speech recognition, the speech dictionary stored in the low-speed RAM is transferred to the high-speed RAM to carry out the speech recognition At the time of speech coding/decoding, the same high-speed RAM is used as a work area. A control unit may be provided to control switching between these two operations, and a codebook may be stored in a ROM.

FIG. 25 is a block diagram of a speech processing device serving as a speech coding/decoding/recognition device equipped with a low-speed RAM and a speech checking unit. In FIG. 25, the same elements as those of FIG. 16 are referred to by the same numerals, and a description thereof will be omitted. The speech coding/decoding/recognition device of FIG. 25 is newly provided with a speech checking unit 40 and an external low-speed RAM 41 in addition to the speech coding/decoding/recognition device of FIG. 16. Further, a high-speed RAM 42 for storing the speech dictionary 10 is provided.

As described above, when results of the processing by the quantizing unit 3 are found to correspond to a noise portion of the codebook 5, the speech checking unit 40 ascertains that an input is not speech, and operates to omit speech recognition in the matching unit 11. The speech dictionary 10 is stored in the low-speed RAM 41, and is transferred to the high-speed RAM 42 at the time of speech recognition. On the other hand, the high-speed RAM 42 is used as a work area at the time of a coding/decoding process. Other operations are the same as those of the speech coding/decoding/recognition device of FIG. 16, and a description thereof will be omitted.

In the application of the present invention, practical variations and modifications may be made without departing from the scope of the present invention.

RAMIFICATIONS OF USE IN INDUSTRY

As described above, the speech processing device of the present invention can incorporate a speech recognition function into a conventional speech coding/decoding device without requiring a large increase in memory volume Because of this, the speech recognition function can be included in a digital mobile phone or the like to provide an interface function such as automatic dialing at a low cost. Further, a function of synthesizing speech for a registered word in the dictionary can be incorporated without requiring a significant increase in the memory volume, so that it is possible to implement at a low cost a function which allows a confirmation of a recognition result to be made based on reproduced speech at the time of automatic dialing.

What is claimed is:

1. A speech processing device comprising:
   a speech analysis unit for obtaining analysis results by analyzing input speech;
   a codebook for storing quantization parameters and quantization codes indicating said quantization parameters;
   a quantizing unit for selecting said quantization parameters and said quantization codes corresponding to said analysis results from said codebook and for outputting selected quantization parameters and selected quantization codes;
   a coding unit for outputting encoded codes of said input speech without involving recognition of the input speech in a coding mode during which the input speech is transmitted to an exterior of the device, said encoded codes including said selected quantization codes;
   a speech dictionary for storing registered data which represent speech patterns by using said codebook; and
   a matching unit for obtaining said speech patterns corresponding to said input speech in a recognition mode by using one of said analysis results, said selected quantization parameters, and said selected quantization codes,
   wherein said coding unit operates in the coding mode but not in the recognition mode while said matching unit operates in the recognition mode but not in the coding mode.

2. The speech processing device as claimed in claim 1, wherein said registered data of said speech dictionary comprises series of said quantization codes, said series of said quantization codes indicating series of said quantization parameters in said codebook to represent said speech patterns.

3. The speech processing device as claimed in claim 2, further comprising a parameter conversion unit for converting said selected quantization parameters of said input speech into input-converted parameters and for converting said speech patterns of said speech dictionary into dictionary-converted parameters, wherein said matching unit matches said input-converted parameters with said dictionary-converted parameters to obtain said speech patterns corresponding to said speech input.

4. The speech processing device as claimed in claim 3, wherein said quantization parameters comprise LPC coefficients, and said input-converted parameters and said dictionary-converted parameters comprise LPC cepstrum coefficients.

5. The speech processing device as claimed in claim 1, further comprising a reference-signal selecting unit for selecting one of said analysis results, said selected quantization parameters, and said selected quantization codes to supply said selected one to said matching unit.

6. The speech processing device as claimed in claim 1, further comprising a speech-dictionary generating unit for generating said speech dictionary by using quantization parameters obtained from analysis results of input speech.

7. The speech processing device as claimed in claim 1, further comprising an analysis-condition changing unit for changing analysis conditions between a speech coding operation for coding said input speech and a speech recognition operation for recognizing said input speech, said analysis conditions being used by said speech analysis unit for obtaining said analysis results.

8. A speech processing device comprising:
   a codebook for storing quantization parameters and quantization codes indicating said quantization parameters;
   an inverse-quantizing unit for selecting said quantization parameters corresponding to received quantization codes from said codebook and for outputting selected quantization parameters;
   a speech synthesizing unit for synthesizing speech by using said selected quantization parameters;

a speech dictionary which is a data storage for storing registered data which represents speech patterns by using said codebook, said registered data including series of said quantization codes which in turn indicate a series of said quantization parameters in said codebook, thereby representing said speech patterns; and a matching unit for obtaining said speech patterns corresponding to said received quantization codes by using one of said selected quantization parameters and said received quantization codes.

9. The speech processing device as claimed in claim 8, wherein said registered data of said speech dictionary comprises series of said quantization codes, said series of said quantization codes indicating series of said quantization parameters in said codebook to represent said speech patterns.

10. The speech processing device as claimed in claim 9, further comprising a parameter conversion unit for converting said selected quantization parameters into reception-converted parameters and for converting said speech patterns of said speech dictionary into dictionary-converted parameters, wherein said matching unit matches said reception-converted parameters with said dictionary-converted parameters to obtain said speech patterns corresponding to said received quantization codes.

11. The speech processing device as claimed in claim 10, wherein said quantization parameters comprise LPC coefficients, and said reception-converted parameters and said dictionary-converted parameters comprise LPC cepstrum coefficients.

12. The speech processing device as claimed in claim 8, further comprising a reference-signal selecting unit for selecting one of said selected quantization parameters and said received quantization codes to supply said selected one to said matching unit.

13. The speech processing device as claimed in claim 8, further comprising a speech-dictionary generating unit for generating said speech dictionary by using quantization parameters obtained from received quantization codes.

14. The speech processing device as claimed in claim 8, further comprising a de coding unit for separating quantization codes of more than one type from received encoded codes.

15. An speech analysis unit for obtaining analysis results by analyzing input speech;

a codebook for storing quantization parameters and quantization codes indicating said quantization parameters;

a quantizing unit for selecting said quantization parameters and said quantization codes corresponding to said analysis results from said codebook and for outputting first selected quantization parameters and selected quantization codes;

a coding unit for outputting encoded codes of said input speech, said encoded codes including said selected quantization codes;

an inverse-quantizing unit for selecting said quantization parameters corresponding to received quantization codes from said codebook and for outputting second selected quantization parameters;

a speech synthesizing unit for synthesizing speech by using said second selected quantization parameters;

a speech dictionary for storing registered data which represent speech patterns by using said codebook; and a matching unit for obtaining said speech patterns corresponding to said input speech by using one of said analysis results, said first selected quantization parameters, and said selected quantization codes, and for obtaining said speech patterns corresponding to said received quantization codes by using one of said second selected quantization parameters and said received quantization codes.

16. The speech processing device as claimed in claim 15, wherein said registered data of said speech dictionary comprises series of said quantization codes, said series of said quantization codes indicating series of said quantization parameters in said codebook to represent said speech patterns.

17. The speech processing device as claimed in claim 16, further comprising synthesizing control means for controlling said speech synthesizing unit to synthesize speech corresponding to a matched speech pattern, said matched speech pattern being said speech patterns corresponding to said input speech and obtained by said matching unit.

18. The speech processing device as claimed in claim 17, wherein said synthesizing control means comprises:

first means for supplying series of said quantization parameters representing said matched speech pattern and other necessary speech synthesizing parameters to said speech synthesizing unit; and second means for generating at least some of said other necessary speech synthesizing parameters.

19. The speech processing device as claimed in claim 18, wherein said second means stores at least some of said other necessary speech synthesizing parameters in addition to generating at least some of said other necessary speech synthesizing parameters.

20. The speech processing device as claimed in claim 19, wherein among said at least some of said other necessary speech synthesizing parameters generated by said second means, at least some are predetermined constants.

21. The speech processing device as claimed in claim 18, wherein said series of said quantization parameters comprise series of LPC coefficients, and said other necessary speech synthesizing parameters comprise parameters for emulating a sound source.

22. The speech processing device as claimed in claim 15, further comprising a reference-signal selecting unit for selecting one of said analysis results, said first selected quantization parameters, said selected quantization codes, said second selected quantization parameters, and said received quantization codes.

23. The speech processing device as claimed in claim 15, further comprising a speech-dictionary generating unit for generating said speech dictionary by using one of quantization parameters obtained from analysis results of input speech and quantization parameters obtained from received-quantization codes.

24. The speech processing device as claimed in claim 23, further comprising a dictionary-signal selecting unit for selecting a dictionary-generation signal for generating said speech dictionary from quantization parameters obtained from analysis results of input speech and quantization parameters obtained from received-quantization codes.

25. The speech processing device as claimed in claim 15, further comprising a parameter conversion unit for converting said speech patterns of said speech dictionary into dictionary-converted parameters, for converting said first selected quantization parameters of said input speech into input -converted parameters, and for converting said second selected quantization parameters of said received quantization codes into reception-converted parameters, wherein said matching unit matches said input-converted parameters with said dictionary-converted parameters to obtain said speech patterns corresponding to said speech input, and matches said reception-converted parameters with said dictionary-converted parameters to obtain said speech patterns corresponding to said received quantization codes.

26. The speech processing device as claimed in claim 25, wherein said quantization parameters comprise LPC coefficients, and said input-converted parameters, said reception-converted parameters, and said dictionary-converted parameters comprise LPC cepstrum coefficients.

27. The speech processing device as claimed in claim 15, wherein coding/decoding is provided by a Code Exited Linear Prediction.

28. The speech processing device as claimed in claim 15, further comprising a speech checking unit for checking processing results of said quantizing unit and for controlling said matching unit not to carry out a process of said matching unit when said processing results are found to correspond to a noise portion of said codebook.

29. The speech processing device as claimed in claim 15, further comprising a high-speed RAM and a low-speed RAM, wherein said speech dictionary is stored in said low-speed RAM and said high-speed RAM is used as a work area during a coding/decoding operation, while said speech dictionary in said low-speed RAM is transferred to said high-speed RAM and said speech dictionary transferred to said high-speed RAM is used for speech recognition during a speech recognition operation.

\* \* \* \* \*